(12) United States Patent
Kiely et al.

(10) Patent No.: US 7,645,947 B2
(45) Date of Patent: *Jan. 12, 2010

(54) ELECTRICAL CONNECTOR WITH OUTER RETAINER RING AND INTERNAL UNIDIRECTIONAL CONDUCTOR RETAINER

(75) Inventors: Kenneth M. Kiely, Milford, CT (US); Delbert Auray, Southport, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,304

(22) Filed: Jan. 6, 2009

(65) Prior Publication Data

US 2009/0120687 A1 May 14, 2009

Related U.S. Application Data

(63) Continuation of application No. 11/501,131, filed on Aug. 8, 2006, now Pat. No. 7,488,905, which is a continuation-in-part of application No. 11/403,099, filed on Apr. 12, 2006, now Pat. No. 7,151,223, which is a continuation-in-part of application No. 11/400,606, filed on Apr. 7, 2006, now Pat. No. 7,154,042, which is a continuation-in-part of application No. 11/364,435, filed on Feb. 28, 2006, now Pat. No. 7,205,489, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(51) Int. Cl.
    *H02G 3/06* (2006.01)
(52) U.S. Cl. ............... 174/666; 174/665; 174/659; 174/656; 174/650; 439/557
(58) Field of Classification Search ............ 174/68.1, 174/68.3, 69, 71 R, 72 C, 650, 659, 664–666; 439/92, 142, 320, 557, 567, 552, 587; 403/197
See application file for complete search history.

(56) References Cited

U.S. PATENT DOCUMENTS

| 1,483,218 A | 2/1924 | Fahnestock |
| 1,725,883 A | 8/1929 | Recker |

(Continued)

*Primary Examiner*—Dhiru R Patel
(74) *Attorney, Agent, or Firm*—Fattibene and Fattibene; Paul A. Fattibene

(57) ABSTRACT

Various embodiments of an electrical connector assembly that includes a connector body having an inlet end portion and an outlet end portion. The outlet end portion is held in a knock out hole of an electric box and the inlet end portion is provided with an adjacent opening for receiving a wire conductor retainer in the form of a flat spring configured to be readily connected to an external portion of a connector body for ease of manufacture and assembly. An electric conductor can be unidirectionally inserted in the inlet end portion and secured thereto so as to prohibit any unintentional separation from the connector body, all without the need of any tools.

16 Claims, 27 Drawing Sheets

U.S. PATENT DOCUMENTS

| | | | |
|---|---|---|---|
| 1,830,250 A | 11/1931 | Tiefenbacher | |
| 2,156,003 A | 4/1939 | Tinnerman | |
| 2,160,353 A | 5/1939 | Conners | |
| 2,445,663 A | 7/1948 | Peters | |
| 2,744,769 A | 5/1956 | Roeder et al. | |
| 2,823,932 A | 2/1958 | Schigut | |
| 3,183,297 A | 5/1965 | Curtiss | |
| 3,436,105 A | 4/1969 | Miklya | |
| 3,544,705 A | 12/1970 | Winston | |
| 3,631,738 A | 1/1972 | Harper | |
| 3,788,582 A | 1/1974 | Swanquist | |
| 3,814,467 A | 6/1974 | Van Buren, Jr. | |
| 3,858,151 A | 12/1974 | Paskert | |
| 3,993,333 A | 11/1976 | Biswas | |
| 4,012,578 A | 3/1977 | Moran et al. | |
| 4,021,604 A | 5/1977 | Dola et al. | |
| 4,032,178 A | 6/1977 | Neuroth | |
| 4,248,459 A | 2/1981 | Pate et al. | |
| 4,361,302 A | 11/1982 | Lass | |
| 4,468,535 A | 8/1984 | Law | |
| 4,619,332 A | 10/1986 | Sheehan | |
| 4,621,166 A | 11/1986 | Neuroth | |
| 4,626,620 A | 12/1986 | Plyler | |
| 4,657,212 A | 4/1987 | Gilmore et al. | |
| 4,711,472 A | 12/1987 | Schnell | |
| 4,773,280 A | 9/1988 | Baumgarten | |
| 4,880,387 A | 11/1989 | Stikeleather et al. | |
| 4,981,310 A | 1/1991 | Belisaire | |
| 4,990,721 A | 2/1991 | Sheehan | |
| 5,132,493 A | 7/1992 | Sheehan | |
| 5,171,164 A | 12/1992 | O'Neil et al. | |
| 5,189,258 A | 2/1993 | Pratesi | |
| 5,266,050 A | 11/1993 | O'Neil et al. | |
| 5,342,994 A | 8/1994 | Pratesi | |
| 5,422,437 A | 6/1995 | Schnell | |
| 6,034,326 A | 3/2000 | Jorgensen | |
| 6,043,432 A | 3/2000 | Gretz | |
| 6,080,933 A | 6/2000 | Gretz | |
| 6,114,630 A | 9/2000 | Gretz | |
| 6,133,529 A | 10/2000 | Gretz | |
| 6,194,661 B1 | 2/2001 | Gretz | |
| 6,335,488 B1 | 1/2002 | Gretz | |
| 6,352,439 B1 | 3/2002 | Stark et al. | |
| 6,355,884 B1 | 3/2002 | Gretz | |
| 6,380,483 B1 | 4/2002 | Blake | |
| 6,444,907 B1 | 9/2002 | Kiely | |
| 6,476,322 B1 | 11/2002 | Dunne et al. | |
| 6,521,831 B1 | 2/2003 | Gretz | |
| 6,555,750 B2 | 4/2003 | Kiely | |
| 6,604,400 B1 | 8/2003 | Gretz | |
| 6,670,553 B1 | 12/2003 | Gretz | |
| 6,682,355 B1 | 1/2004 | Gretz | |
| 6,737,584 B2 | 5/2004 | Kiely | |
| 6,768,057 B2 | 7/2004 | Blake | |
| 6,780,029 B1 | 8/2004 | Gretz | |
| 6,849,803 B1 | 2/2005 | Gretz | |
| 6,860,758 B1 | 3/2005 | Kiely | |
| 6,872,886 B2 | 3/2005 | Kiely | |
| 6,916,988 B1 | 7/2005 | Auray et al. | |
| 6,935,890 B1 * | 8/2005 | Gretz | 439/552 |
| 7,060,900 B1 * | 6/2006 | Gretz | 174/652 |
| 7,154,054 B1 | 12/2006 | Gretz | 174/655 |
| 7,161,095 B1 | 1/2007 | Gretz | 174/655 |
| 7,214,890 B2 * | 5/2007 | Kiely et al. | 174/666 |
| 7,226,309 B1 | 6/2007 | Gretz | 439/460 |
| 7,238,894 B1 | 7/2007 | Gretz | 174/655 |

* cited by examiner

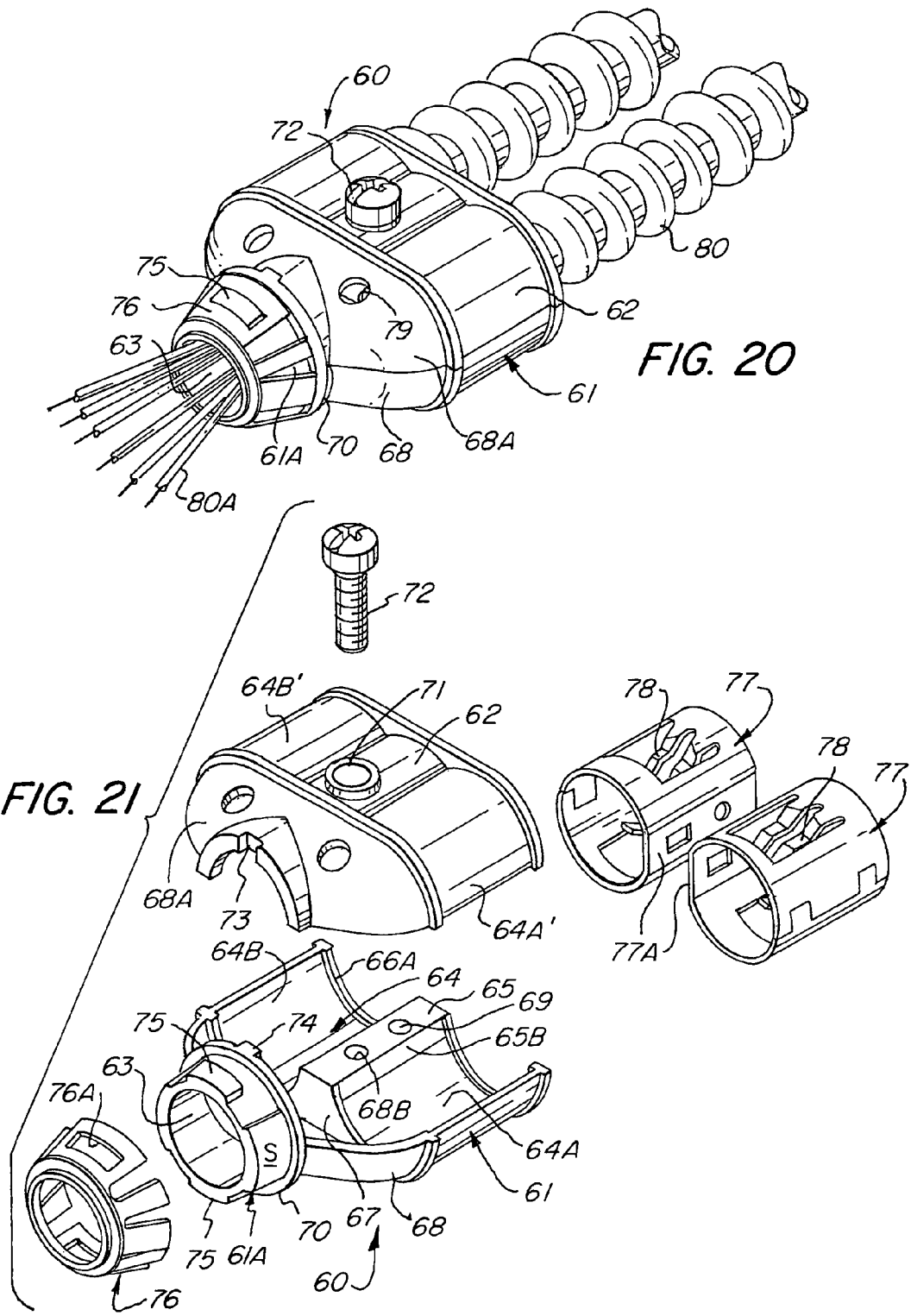

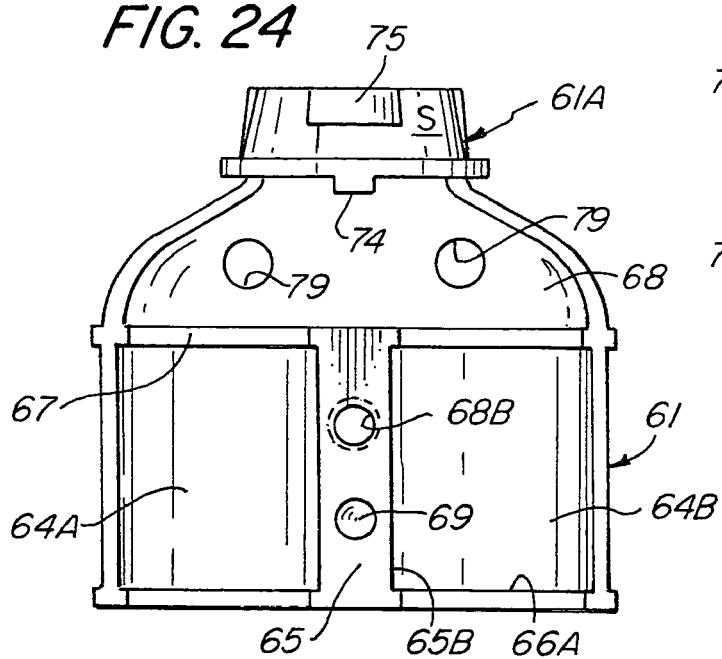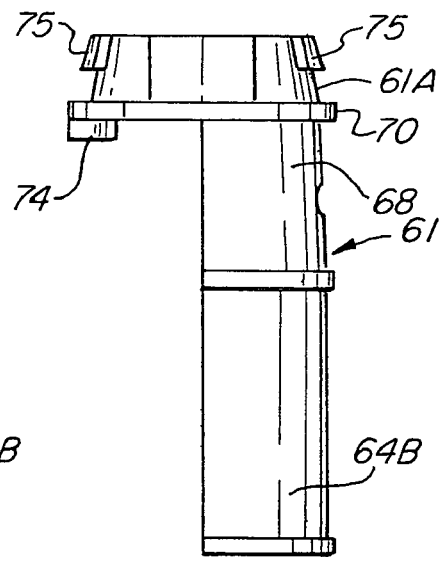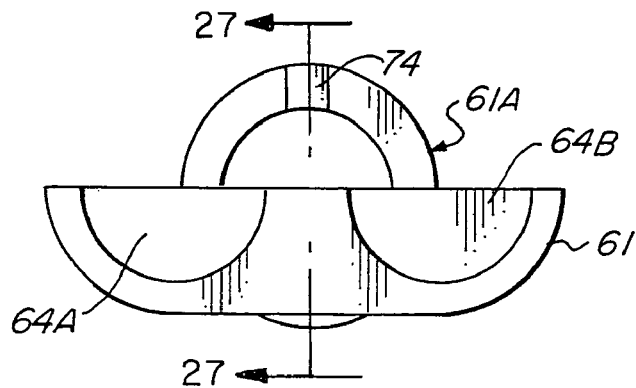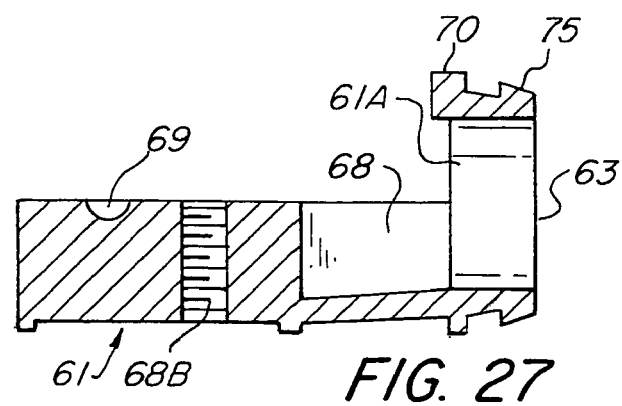

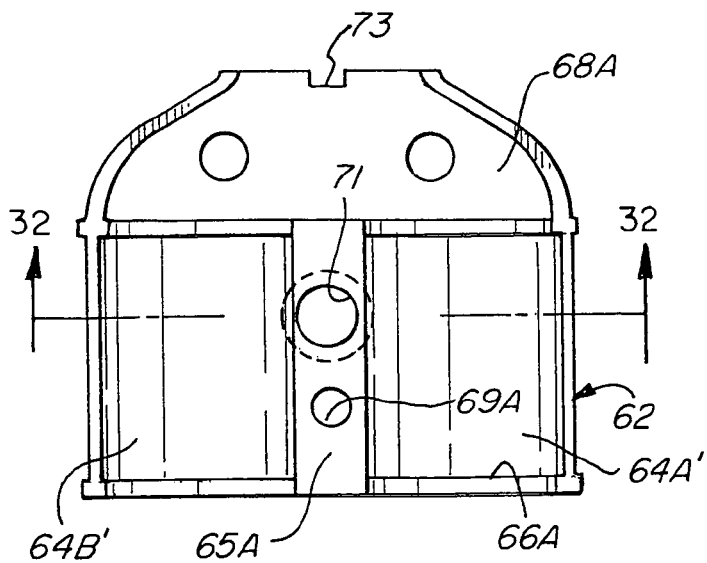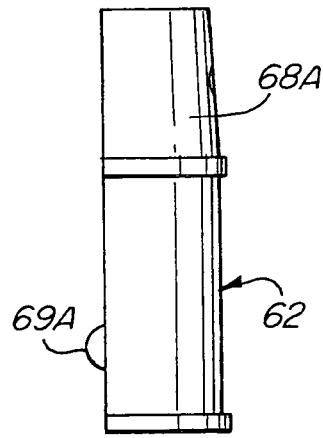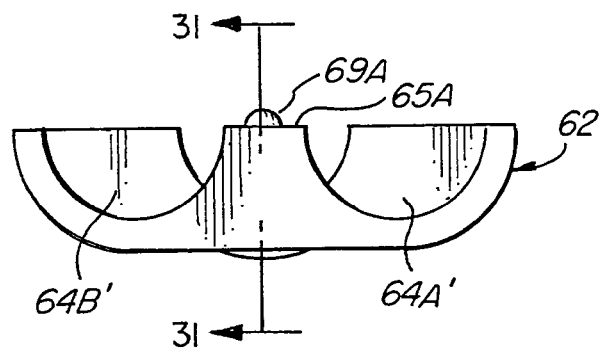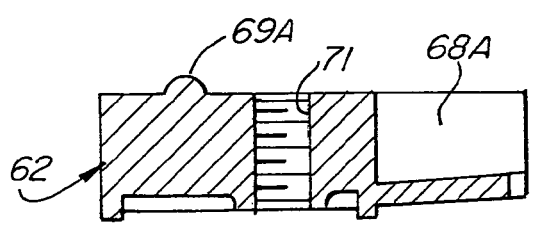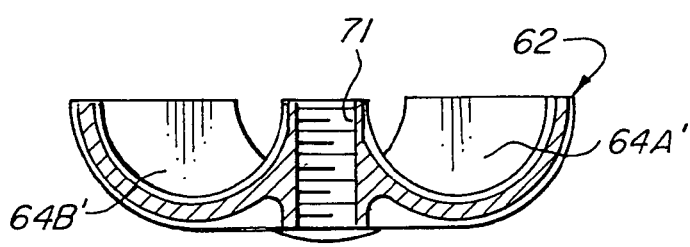

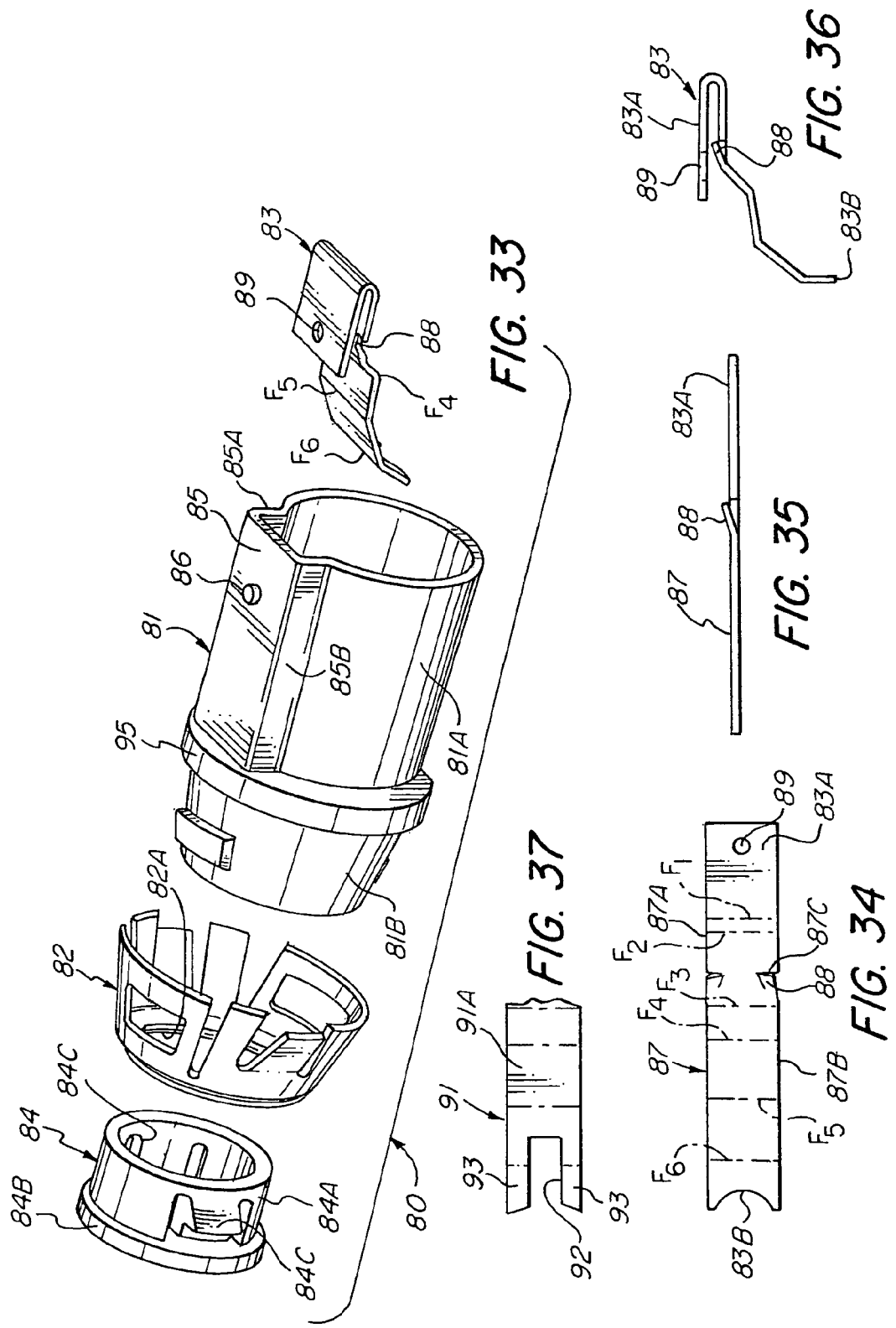

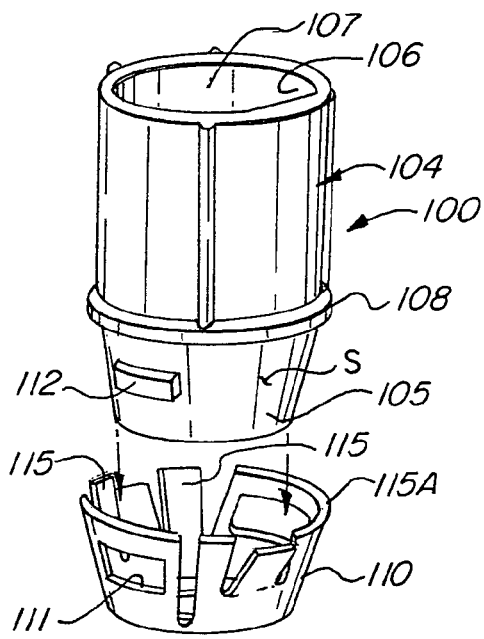
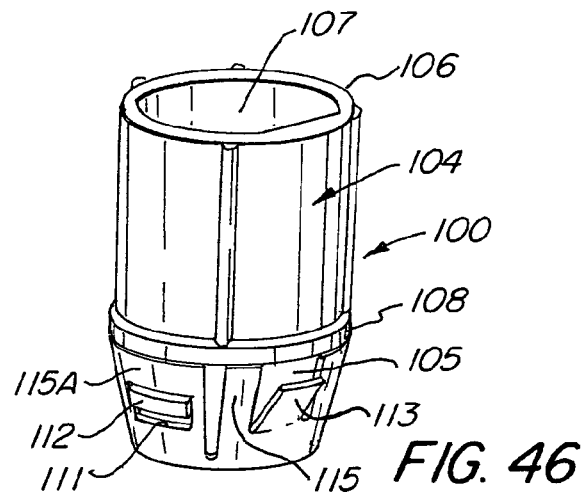
FIG. 45
FIG. 46
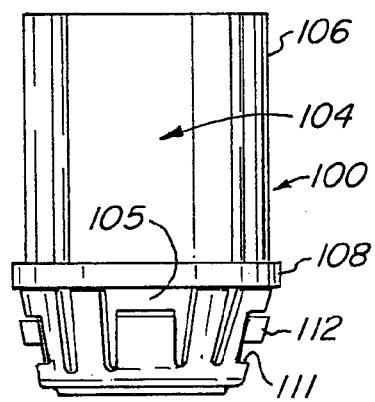
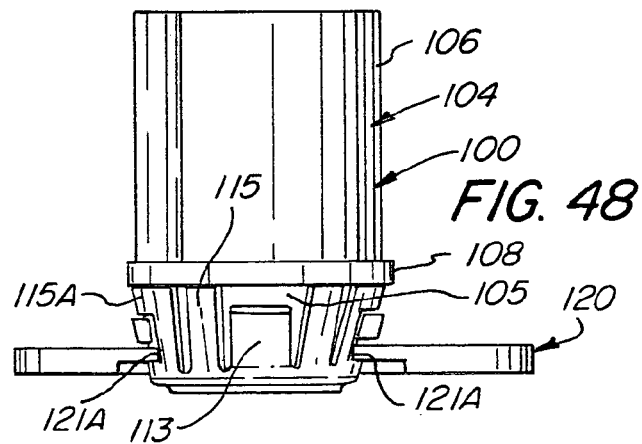
FIG. 47
FIG. 48
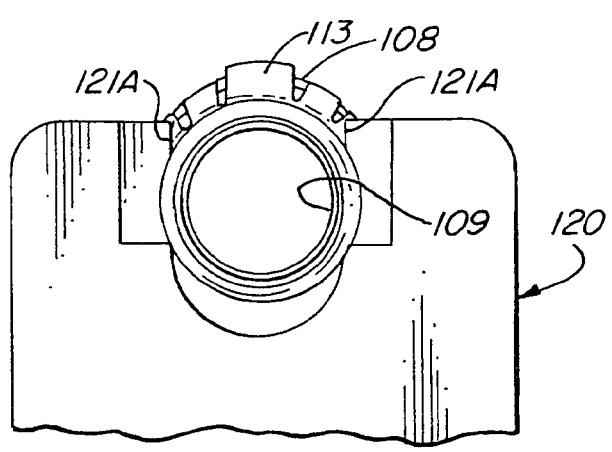
FIG. 49

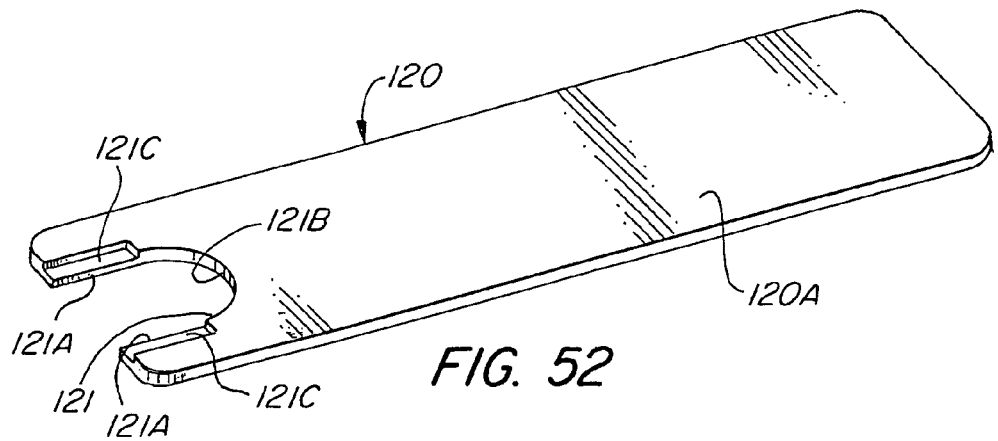
FIG. 52
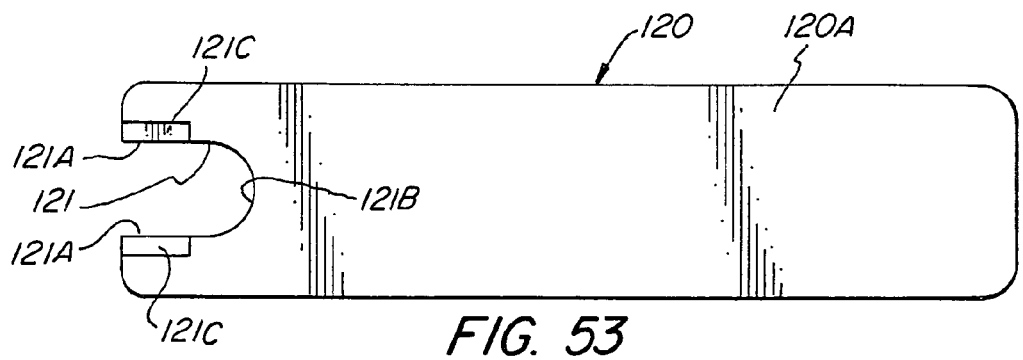
FIG. 53
FIG. 54
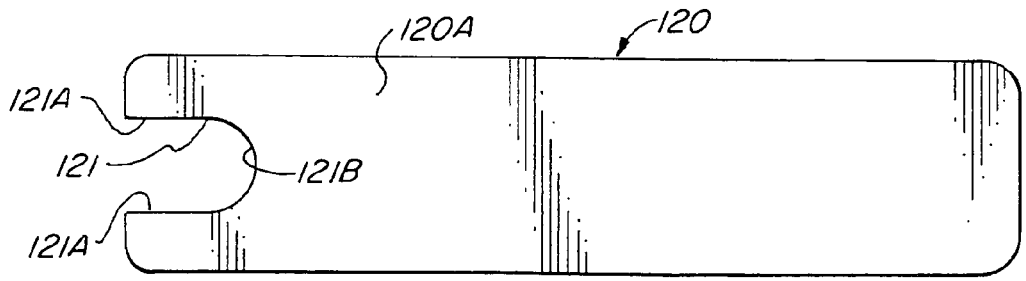
FIG. 55
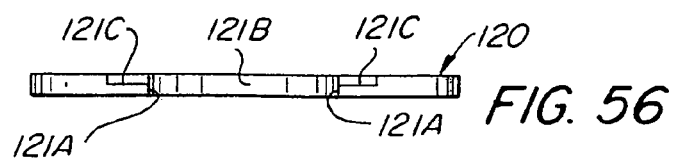
FIG. 56

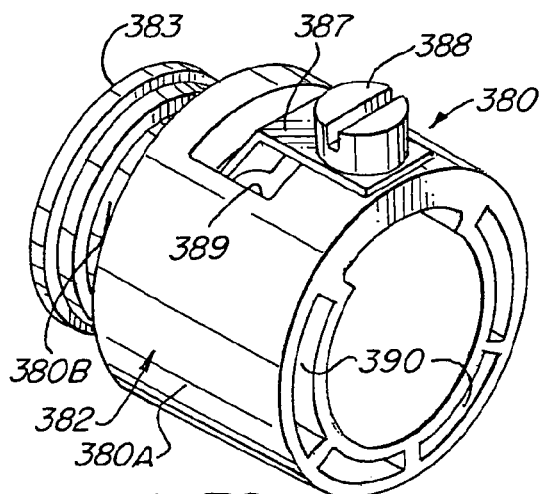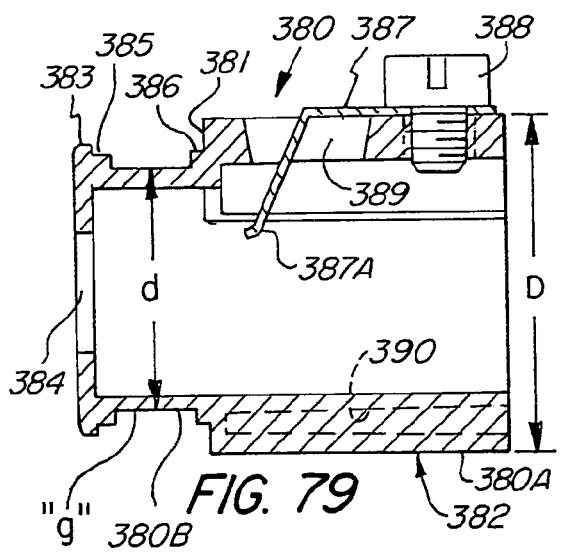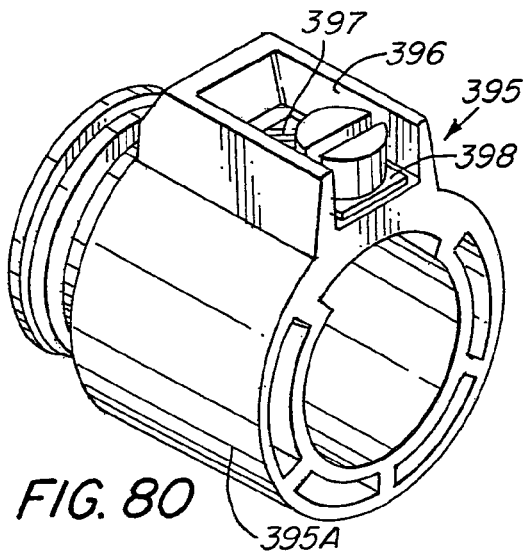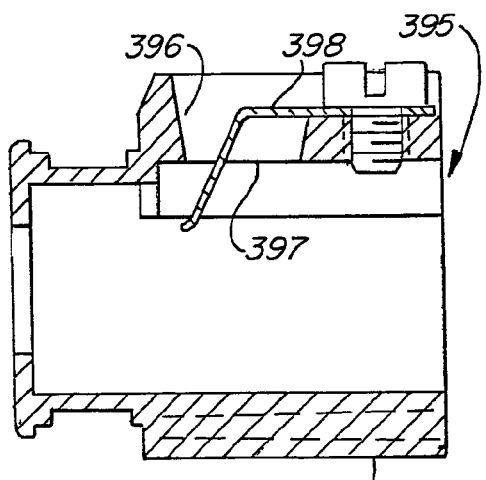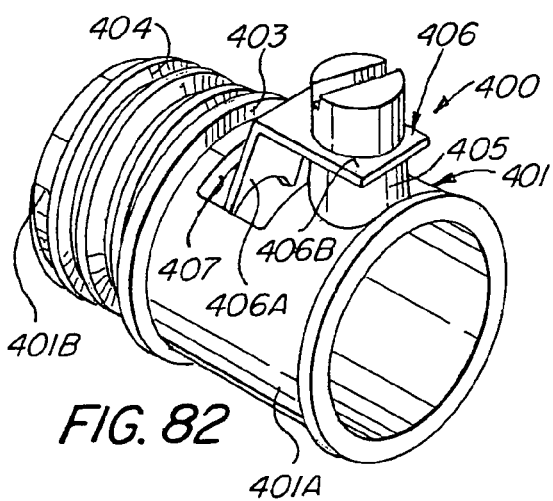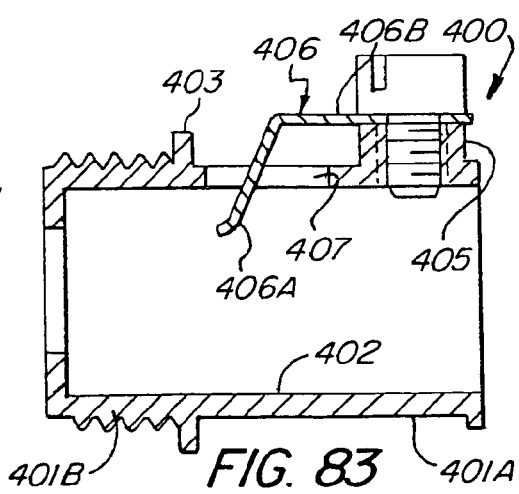

ELECTRICAL CONNECTOR WITH OUTER RETAINER RING AND INTERNAL UNIDIRECTIONAL CONDUCTOR RETAINER

RELATED APPLICATIONS

This application is a continuation of application Ser. No. 11/501,131 filed Aug. 8, 2006, now U.S. Pat. No. 7,488,905 which is a continuation in part application of application Ser. No. 11/403,099 filed Apr. 12, 2006, now U.S. Pat. No. 7,151,223 for Snap Fit Electrical Connector Assembly With Frustro Conical Retainer Ring And Internal Unidirectional Snap Fit Wire Conductor Retainer, which is a continuation in part application of application Ser. No. 11/400,606 filed Apr. 7, 2006, now U.S. Pat. No. 7,154,042 for Electrical Connector With Frustro Conical Snap Fit Retainer Ring Constructed To Enhance The Insertion Of The Connector Through A Knockout Hole Of An Electric Box, which is a continuation in part application of application Ser. No. 11/364,435 filed Feb. 28, 2006, now U.S. Pat. No. 7,205,489 for Snap-Fit Electrical Connector Assembly For Facilitating The Connection of the Electric Connector Assembly To An Electric Box, which is a continuation in part of application Ser. No. 11/258,990 filed Oct. 26, 2005, now U.S. Pat. No. 7,057,107 which is a continuation in part of application Ser. No. 11/151,374 filed Jun. 13, 2005, now U.S. Pat. No. 7,075,007 for Snap Fit Electrical Connector Assembly With Conical Outer Snap Fit Retainer And One Or More Internal Snap Fit Wire Retainers, which is a continuation in part of application Ser. No. 11/100,250 filed Apr. 6, 2005, now U.S. Pat. No. 7,064,272 for Snap In Electrical Connector Assembly With Unidirectional Wire Conductor Retainer Ring, which is a continuation in part application of application Ser. No. 10/939,619 filed Sep. 13, 2004 for Electrical Connector With Frustro Conical Snap Fit Retaining Ring, now U.S. Pat. No. 6,916,988 B1, each of which are incorporated herein by reference.

FIELD OF THE INVENTION

This invention is directed to a further advancement in the field of electrical connector assemblies having a snap fit retaining ring circumscribing the outlet end of a connector body for effecting a snap fit connection to an electrical box of the types described in U.S. Pat. No. 6,860,758, U.S. Pat. No. 6,935,891 and application Ser. No. 11/180,085 filed Jul. 13, 2005, which is a continuation in part application of application Ser. No. 11/028,373 filed Jan. 3, 2005, which are incorporated herein by reference.

More specifically, this application relates to further improvements in electrical connector assembly having a construction for facilitating the connection of an electrical connector assembly to an electric box and having one or more inlets provided with a simplified unidirectional wire retainer to which one or more associated cables, wire conductors or the like are secured by simply inserting the wire conductor into the inlet end of the connector body. The respective inlet or inlets of the connector body include a simplified externally mounted wire or conductor retainer that allows an associated wire, cable or conductor to be positively secured within the associated inlet by a snap fit in a manner that prohibits any unintentional separation or withdrawal of the conductors from the connector assembly.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box or panel. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement.

Also known are connectors formed as connector caps which are adapted to be fitted over the end of a conductor, cable or wires, such as disclosed in U.S. Pat. No. 4,880,387. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803. Notwithstanding the extensive background relating to electrical connectors, continuing efforts are being made to improve, simplify and/or reduce the cost and/or complexity of the known connectors in an effort to advance the electrical connector art. The disclosures herein are directed to such efforts.

SUMMARY OF THE INVENTION

An object of this invention is to provide an electrical connector with a frustro-conically shaped external retaining ring having integrally formed outwardly sprung locking tangs and an electrical grounding trailing edge arranged to be snap fitted to a knock-hole of an electric box or panel.

Another object of this invention is to provide for an electrical connector assembly that includes an electrical connector body having an outlet end with a frustro-conical outer surface having a complementary frustro-conical retaining ring that is readily fitted to and retained on the outlet end portion of the connector body.

Another object is to provide a connector assembly comprising a connector body having an outlet portion free of any locking ring retaining flange, and an associated snap fit retainer ring circumscribing the outlet end portion.

Another object is to provide a retaining ring having outwardly flaring circumscribing arms or sides provided with outwardly sprung locking tangs and a grounding trailing edge.

Another object is to provide a retaining ring, adapted to be fitted onto the outlet end of a connector body, and having a frustro-conical shape with a first series of tangs for securing the connector body relative to an electrical box and a trailing edge for affecting a positive electrical ground with an associated electrical box.

Another object is to provide a frustro-conically shaped retaining ring that can be readily formed from a blank of spring steel.

Another object is to provide an electrical connector assembly having a connector body with a frustro-conical outer retainer ring circumscribing the outer surface of the connector body outlet end and a unidirectional wire conductor retainer associated with the inlet end of the connector for securing an electrical wire or conductor thereto.

Another object is to provide an electrical connector assembly that includes an externally connected unidirectional wire or conductor retainer extending internally of the inlet end for frictionally retaining a wire conductor to the connector assembly so as to prevent any unintentional separation of a wire conductor therefrom.

Another object is to provide an electrical connector assembly provided with a snap fitting retainer ring on the outlet end of the connector assembly for attaching the connector assembly to an electrical box with a snap fit and including an inner unidirectional wire conductor retainer extending into the inlet end of the connector assembly for securing a wire conductor thereto in a manner to prohibit any unintentional separation of the wire conductor from the connector assembly.

Another object is to provide an electrical connector with an improved wire retainer whereby a wire retainer is externally secured to the connector body and is arranged to extend into the inlet end of the connector body through an opening formed in the connector body to secure the wire conductor therein so as to prohibit any unintentional separation of the wire conductor from the connector body.

Another object of this invention is to provide an electrical connector with a wire retainer whereby a helical wound wire conductor can be secured thereto by merely inserting the armored conductor wire into the inlet end of the electrical connector to secure the wire conductor thereto, so as to prohibit any unintentional separation of the wire conductor from the electrical connector.

Another object is to provide or an electrical connector assembly that is relatively simple to fabricate, positive in operation, and economical to produce and sell.

Another object of this invention is to provide an electrical connector assembly having an outer frustro conical retainer ring for positively connecting the connector assembly to an electrical box and having multiple inlet ends, each inlet end being fitted with an externally connected wire retainer for unidirectional locking a wire conductor in each of the respective multiple inlets.

Another object of this invention is to provide an improved multiple connector assembly that is relatively simple in structure, easy to assemble and having a minimum of component parts.

Another object is to provide a connector assembly having multiple inlet ends, each inlet end being fitted with an externally mounted wire or conductor retainer that extends internally of the associated inlet end for effecting unidirectional locking of a wire conductor therein.

Another object is to provide an electrical connector having an outer retainer ring circumscribing the outer end of a connector body for effecting a snap fit attachment to an electric box or panel and having an improved unidirectional wire conductor retainer in the form of a retaining finger projecting through an opening in the connector body and into the inlet end of a connector body so as to provide a snap fit wire retention device which prohibits any unintentional separation of the wire conductor from the connector body.

Another object is to provide a relatively simple and positive acting snap fit wire conductor retaining device externally mounted on a connector body and having an end portion extending through an opening or window into the interior of the connector body for retaining a wire conductor connected to the electrical connector body in a manner to prohibit any unintentional separation of a wire conductor from the connector.

Another object is to provide a snap fit wire retainer that extends inwardly of an electrical connector body through an opening formed therein whereby the wire retainer can be readily secured on the exterior of the connector body to facilitate and simplify the assembly of the connector and associated wire retainer.

Another object is to provide an electrical connector having a wire retainer arranged to be externally secured to the connector in a fixed relationship relative to the connector so that the free end of the wire conductive retainer extends through an opening formed in the connector body and into the inlet end portion of the connector so as to permit a wire conductor be unidirectionally snap fitted thereto.

The foregoing objects and other features and advantages are attained by an electrical connector assembly that includes a connector body having one or more inlet end portions for receiving an electrical conductor and an outlet portion arranged to be inserted through a knockout hole of an electrical panel or electric box, e.g. an electric box or the like. A radially outwardly extending flange circumscribes an intermediate portion of the connector body to function as a stop to limit the insertion of the outlet end portion of the connector body through the knockout hole of an electric box. The outlet end portion of the connector body is provided with an outer surface that converges or tapers inwardly toward the outlet opening thereof. Formed on the surface of the outlet end portion are one or more retaining lugs, which may be circumferentially spaced about the outlet end portion. A frustro-conically shaped snap ring is fitted onto the outlet end portion.

The outer retaining ring is initially formed from a blank of sheet material, e.g. spring steel or the like, having a cruciform shape that includes a face portion or simply a central opening wherein the radiating arms of the cruciform blank are disposed about the face portion or central opening to define a frustro-conical ring or cup. The ring so formed is provided with blanked out or die cut tangs to define outwardly bent locking tangs. The trailing edge of the frustro-conical ring provides for electrical grounding. The frustro-conical ring so formed also has a slot adapted to receive the retaining lug when the retaining ring is fitted onto the outlet end portion of the connector body so that the free or trailing ends of the ring define a ground or edge that engages the inner periphery of the knockout hole of an electric box for effecting positive electrical continuity and grounding.

To form the retaining ring, the cruciform arms are arranged to be folded relative to the central opening or face forming portion that circumscribes the central opening, to define a unitary frustro-conically shaped cup-like member or ring to compliment or be fitted onto the outlet end portion of the connector body. The retaining ring thus formed is fitted over or onto the outlet end portion whereby the retaining slot formed in the ring is adapted to receive the complementary retaining lug formed on the surface of the outlet end portion for retaining the ring on the outlet end portion of the connector body.

With the construction described, the connector assembly can be readily inserted through the knockout hole of an electric box wherein the locking tangs will initially be flexed inwardly to pass through the knock-out hole of an electric box, and then spring outwardly to lock the connector assembly to the electric box with the trailing or grounding edge of the retaining ring or arms being inherently biased so as to be urged against the internal periphery of the knockout hole due to the conical configuration of the retaining ring to effect a positive electric ground as a result of the inherent resiliency of the respective grounding edges and the material from which they are formed.

This invention further contemplates providing the inlet end of the connector with an improved wire or conductor retainer which is uniquely formed for positively securing thereto a wire conductor by merely inserting the wire conductor into the inlet end of a connector. The arrangement is such that the wire conductor is prohibited from being unintentionally separated therefrom. The inner wire conductor retainer is preferably formed of a blank of spring metal material to define a spring finger having one end thereof fixedly secured to an external portion of the inlet end of a connector body, and having the other end of the spring finger extending through an opening formed in the connector body so as to be disposed at an angle to the longitudinal axis of the inlet end portion whereby a wire conductor is retained within the inlet end of a connector in a manner to prohibit any unintentional separation.

A further embodiment of the disclosed invention may utilize an external circular shaped snap fit locking ring for circumscribing the outlet end of the connector body.

BRIEF DESCRIPTION OF THE DRAWINGS

FIG. 20 is a perspective view of a further embodiment of the invention.

FIG. 21 is an exploded perspective view of the embodiment of FIG. 20.

FIG. 24 is the interior plan view of one section of the connector housing of the embodiment illustrated in FIG. 20.

FIG. 25 is an outer end view of FIG. 24.

FIG. 26 is an end view of the connector housing section of FIG. 24.

FIG. 27 is a sectional view of the housing section taken along line 27-27 on FIG. 26.

FIG. 28 is an inside plan view of the complementary housing section of the embodiment illustrated by FIG. 20.

FIG. 29 is an end view of FIG. 28.

FIG. 30 is an inlet end view of FIG. 28.

FIG. 31 is a sectional view taken on line 31-31 on FIG. 30.

FIG. 32 is a sectional view taken on line 32-32 on FIG. 28.

FIG. 33 is a perspective exploded view of a further embodiment of the invention.

FIG. 34 is a top plan view of the blank from which the wire retainer device is formed.

FIG. 35 is a side view of the blank of FIG. 34.

FIG. 36 is a side view of the blank of FIGS. 34 and 35 as formed to define wire retainer.

FIG. 37 is a top view of a slightly modified form of a wire retainer.

FIG. 45 is an exploded perspective of another modified form of the invention.

FIG. 46 is a perspective view similar to FIG. 45 illustrated in the assembled position.

FIG. 47 is a side view of FIG. 46.

FIG. 48 is a side view of the connector assembly of FIG. 47 in engagement with a pulling tool of the present invention.

FIG. 49 is a bottom plan view of FIG. 48.

FIG. 52 is a perspective view of the operating tool embodiment for facilitating the locking of an electrical connector to an electric box.

FIG. 53 is a plan view of the tool of FIG. 52.

FIG. 54 is an edge view of FIG. 53.

FIG. 55 is a bottom plan view of FIG. 54.

FIG. 56 is a left end view of FIG. 55.

FIG. 78 is a perspective view of another embodiment of the invention.

FIG. 79 is a cross sectional view of FIG. 78.

FIG. 80 is a perspective view of another modified embodiment.

FIG. 81 is a cross sectional view of FIG. 80.

FIG. 82 is a perspective view of another modified embodiment.

FIG. 83 is a cross sectional view of FIG. 82.

DETAILED DESCRIPTION OF THE PREFERRED EMBODIMENTS

Figure 1:
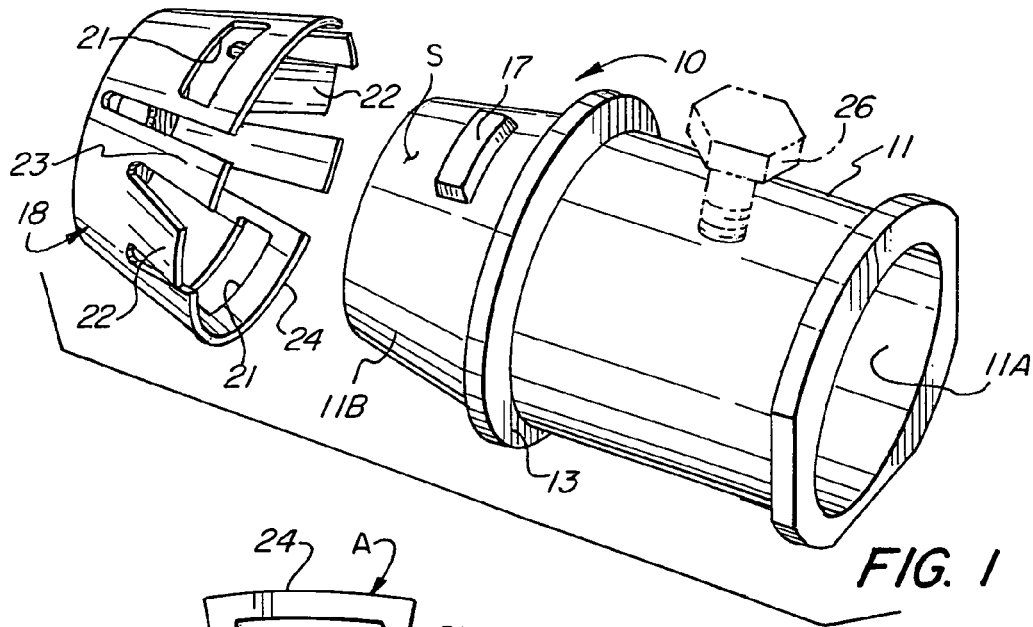
FIG. 1 is an exploded perspective view of the electrical connector assembly.

Referring to the drawings, there is shown in FIG. 1 an electrical connector assembly 10. The connector assembly 10 includes a connector body 11, which is usually formed of metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box 15, as noted in FIG. 8.

Figure 8:
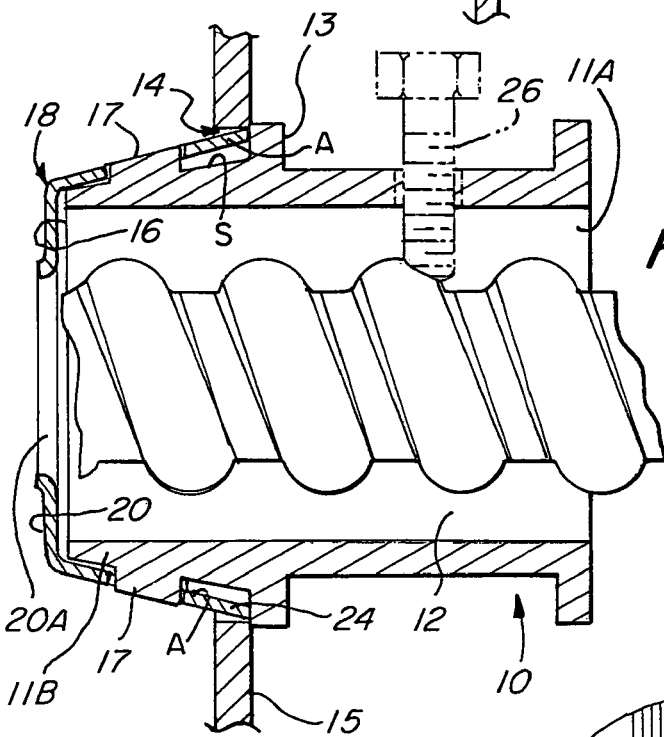
FIG. 8 is a section side view illustrating the connector assembly secured to an electric box, taken along line 8-8 on FIG. 10.
Figure 10:
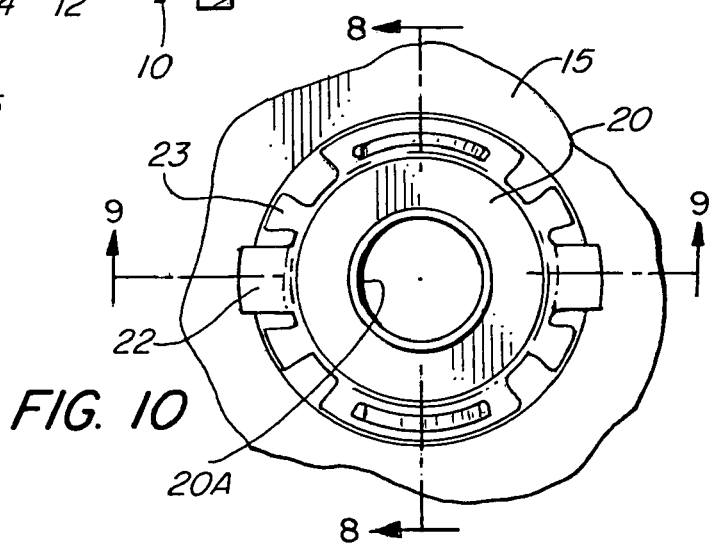
FIG. 10 is a fragmentary front view of the connector assembly secured to an electric box as viewed from the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

Figure 2:
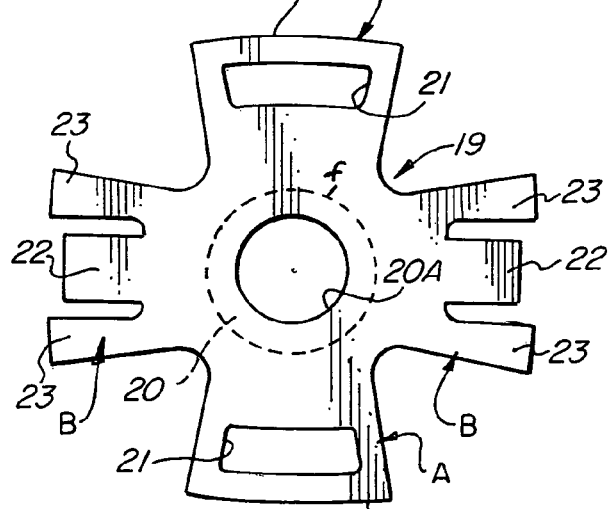
FIG. 2 is a plan view of the blank from which the outer retaining ring of the present invention is formed.
Figure 3:
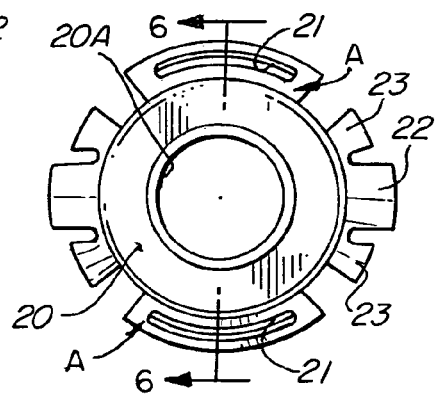
FIG. 3 is a detail front view of the outer retainer ring.
Figure 5:
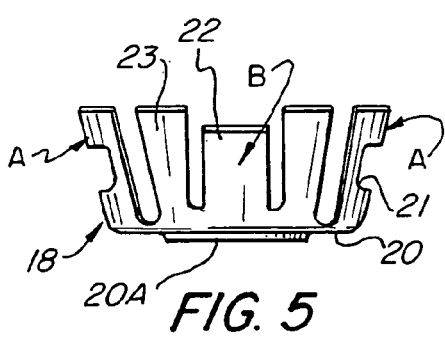
FIG. 5 is a detail end view of FIG. 4.
Figure 4:
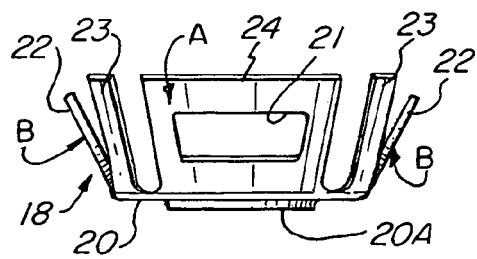
FIG. 4 is a detail top plan view of the outer retainer ring of FIG. 3.
Figure 6:
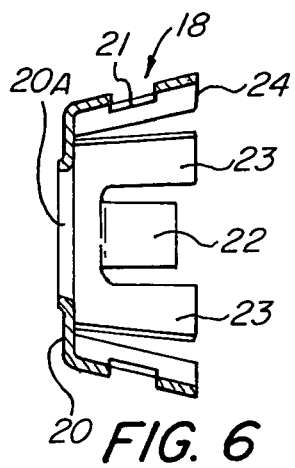
FIG. 6 is a sectional view of the outer retainer ring taken along line 6-6 on FIG. 3.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
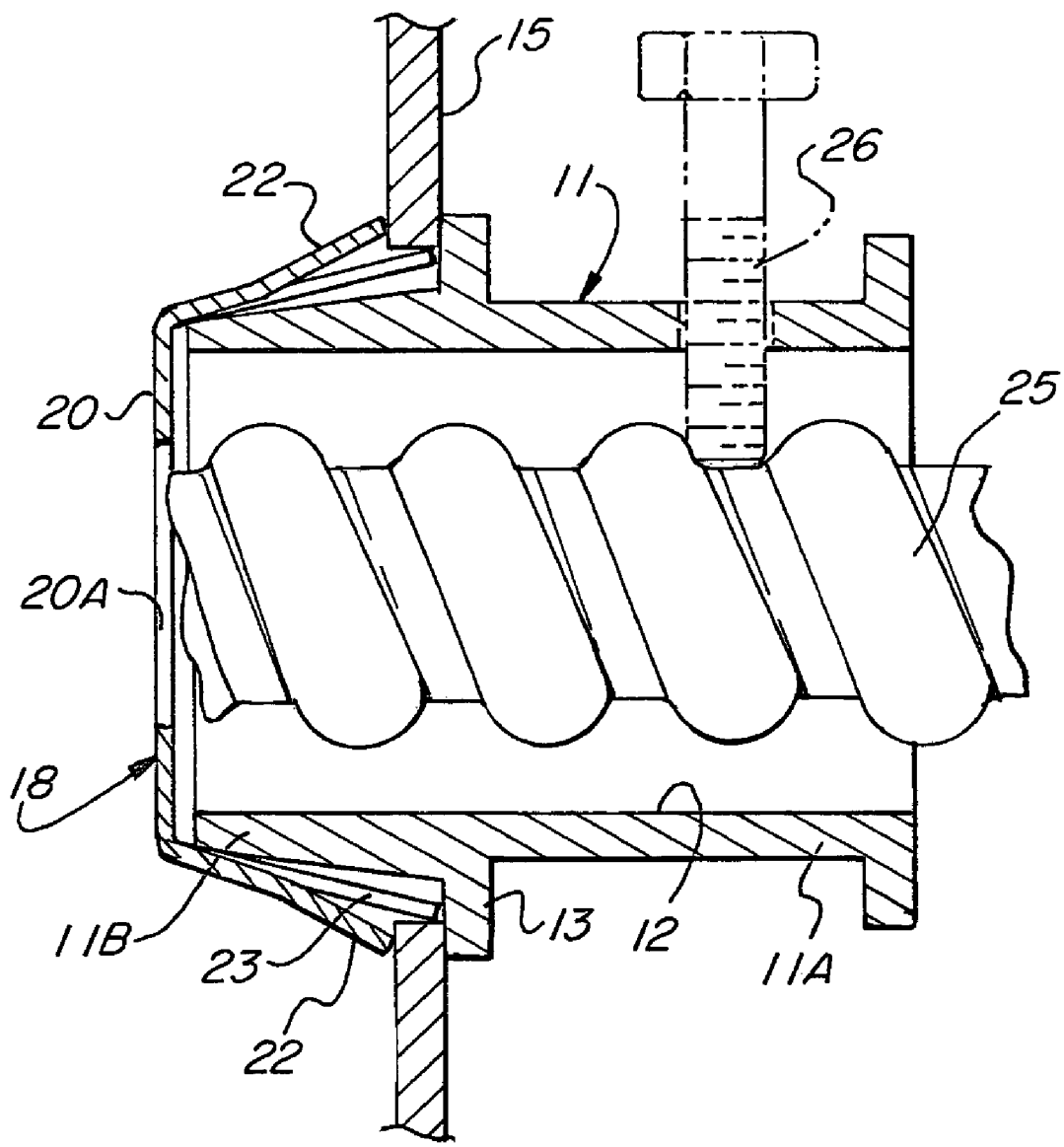
FIG. 9 is a sectional side view taken along line 9-9 on FIG. 10 and rotated 90°.
Figure 11:
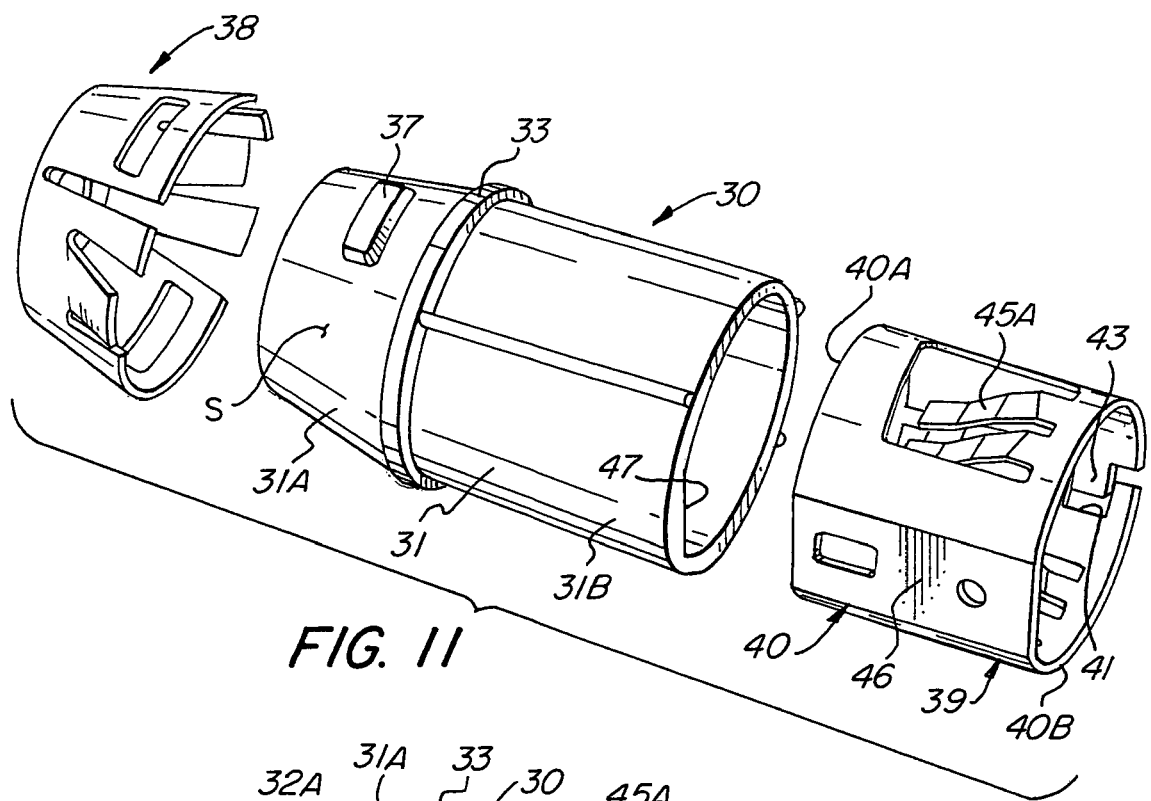
FIG. 11 is an exploded perspective view of a modified form of the invention.
Figure 12:
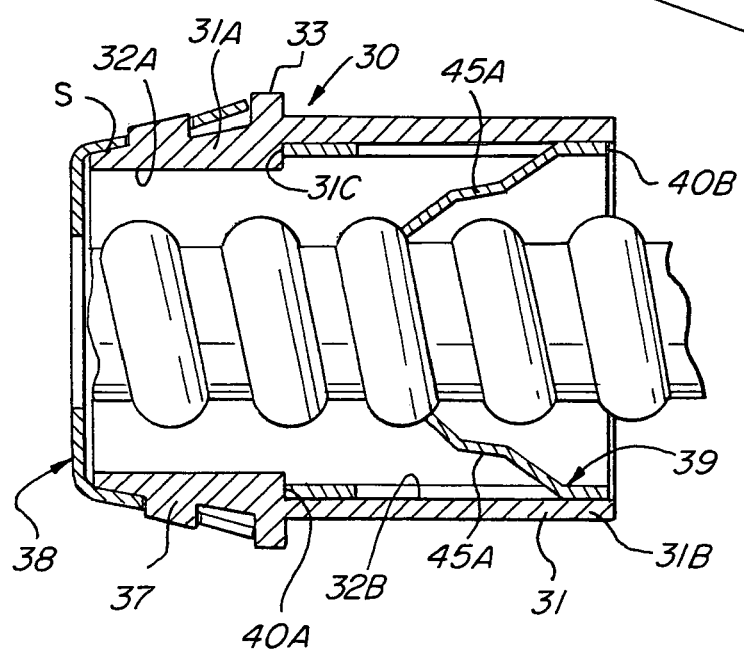
FIG. 12 is a sectional side view of the modified form of the invention of FIG. 11.
Figure 13:
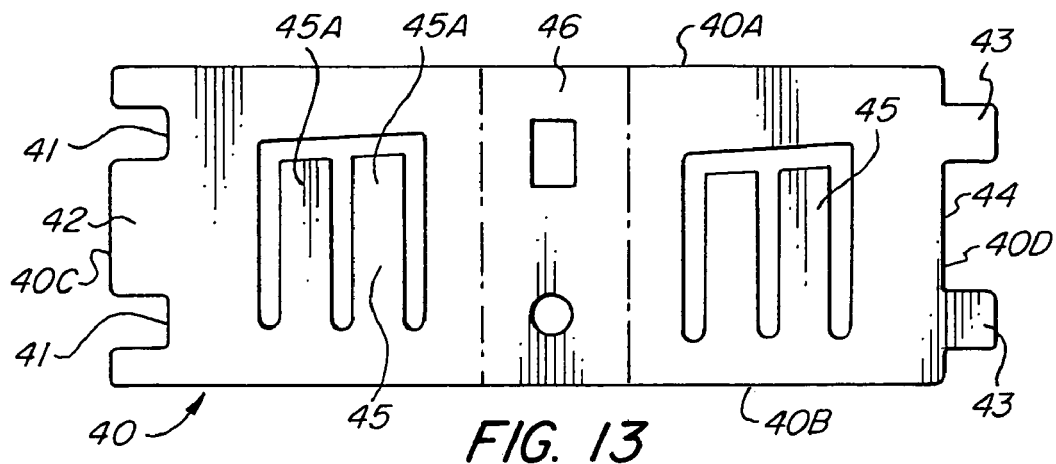
FIG. 13 is a top plan view of the blank from which the internal wire conductor retainer is formed.
Figure 14:
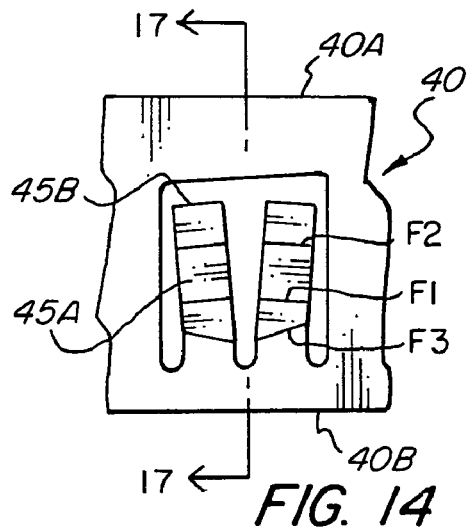
FIG. 14 is a fragmentary top view of a portion of the blank forming the inner retainer sleeve or ring.
Figure 15:
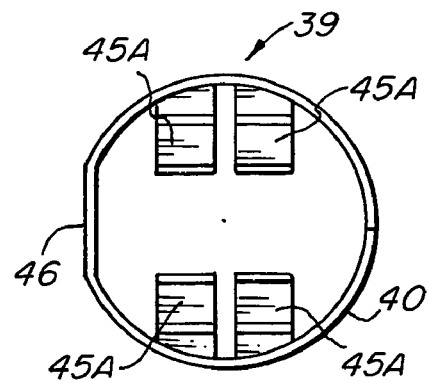
FIG. 15 is an end view of the inner wire conductor retainer ring or sleeve.
Figure 17:
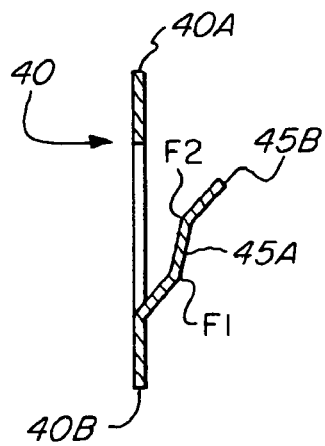
FIG. 17 is a section view taken along 17-17 on FIG. 16.
Figure 16:
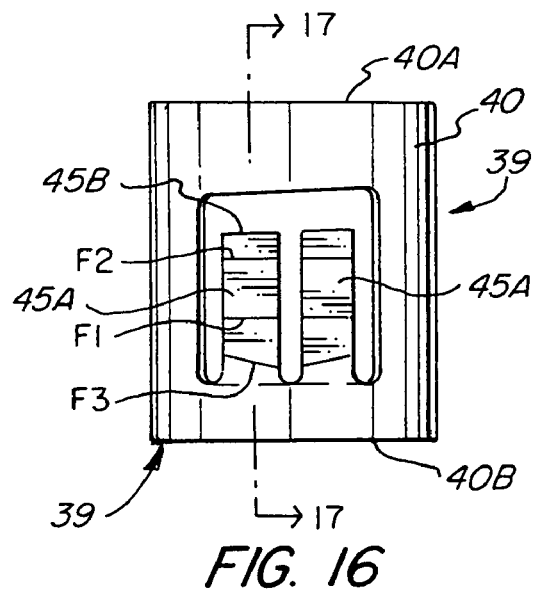
FIG. 16 is a top view of the inner retainer ring or sleeve of FIG. 15.
Figure 18:
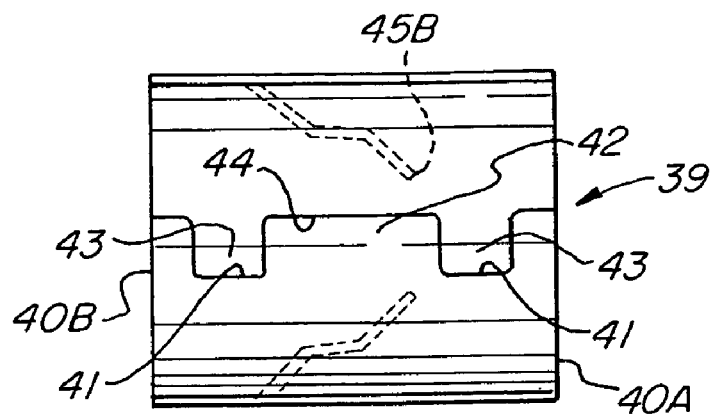
FIG. 18 is a side view of the inner retainer ring or sleeve.
Figure 19:
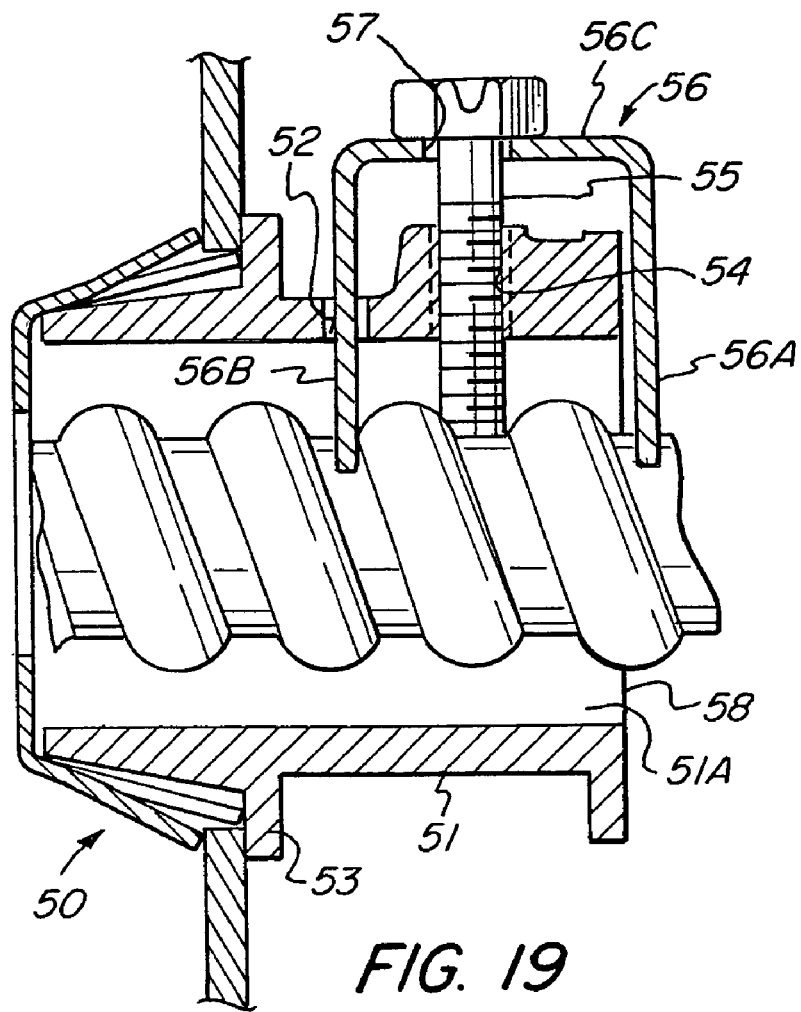
FIG. 19 is a sectional side view of still another embodiment.
Figure 22:
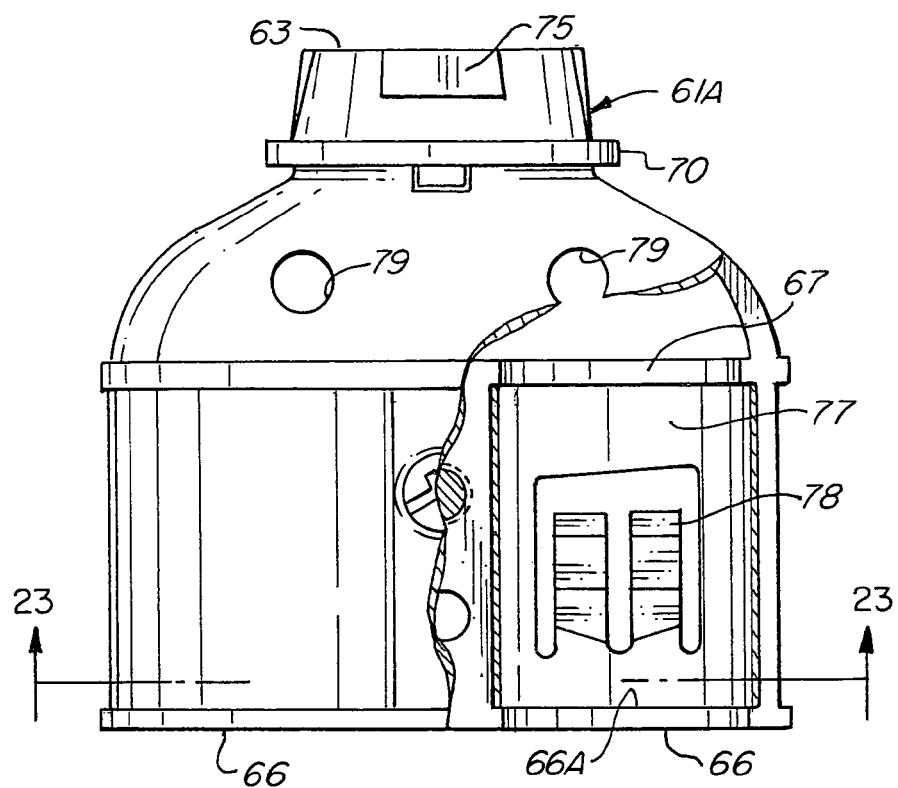
FIG. 22 is a top plan view of the embodiment of FIG. 20 having parts thereof broken away.
Figure 23:
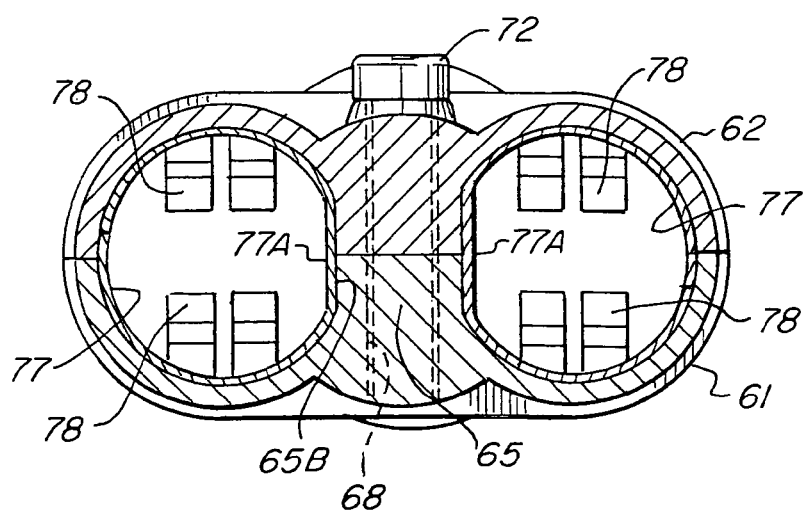
FIG. 23 is a sectional view taken along line 23-23 on FIG. 22.
Figure 38:
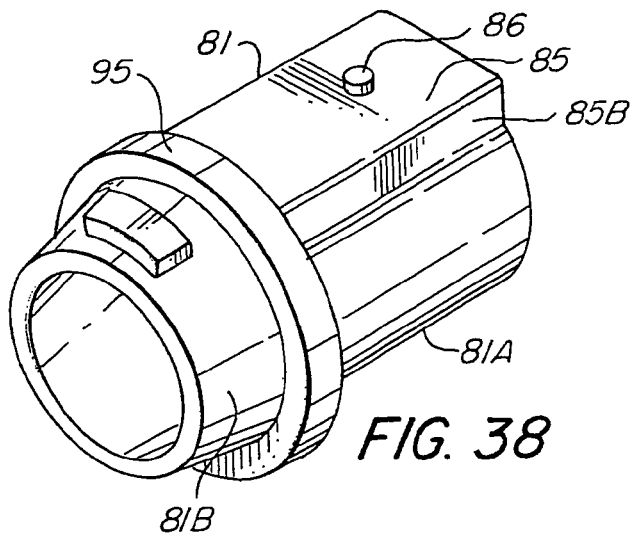
FIG. 38 is a perspective view of the connector body embodying the invention of FIG. 33.
Figure 41:
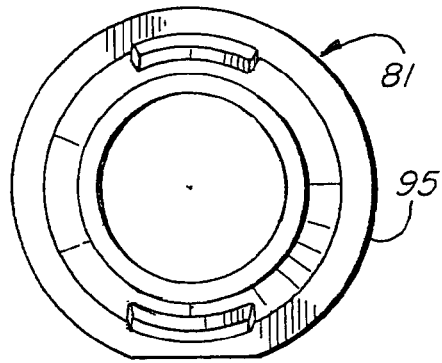
FIG. 41 is a left end view of FIG. 39.
Figure 39:
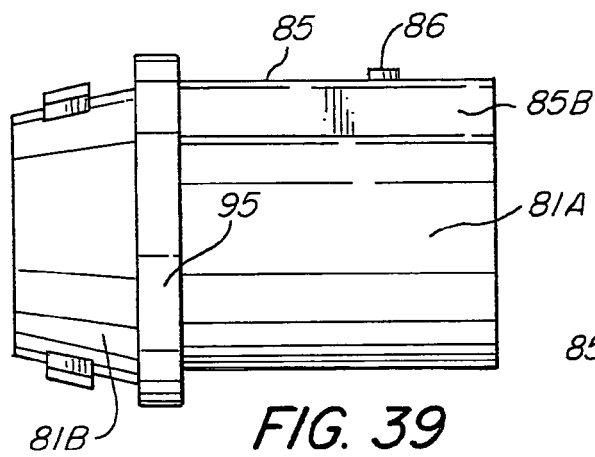
FIG. 39 is a side view of FIG. 38.
Figure 42:
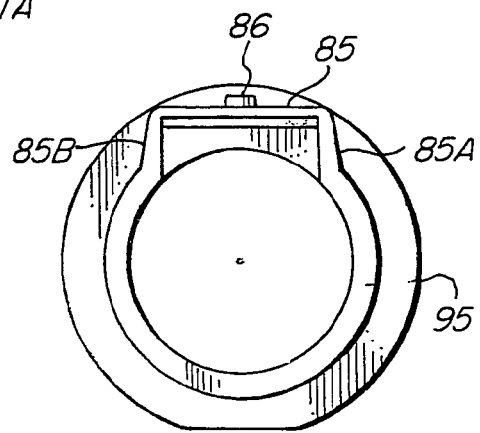
FIG. 42 is a right end view of FIG. 39.
Figure 40:
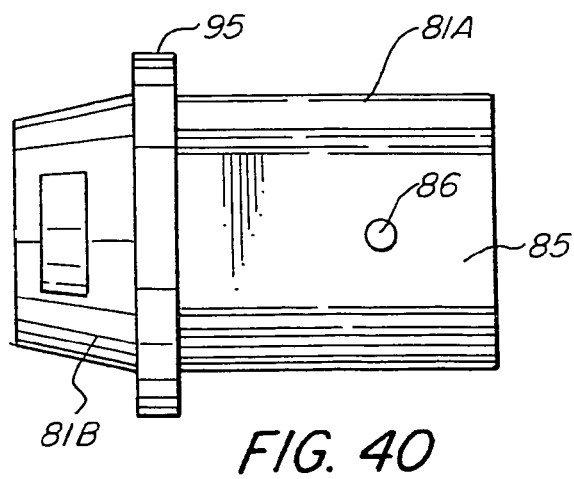
FIG. 40 is a top plan view of FIG. 39.
Figure 43:
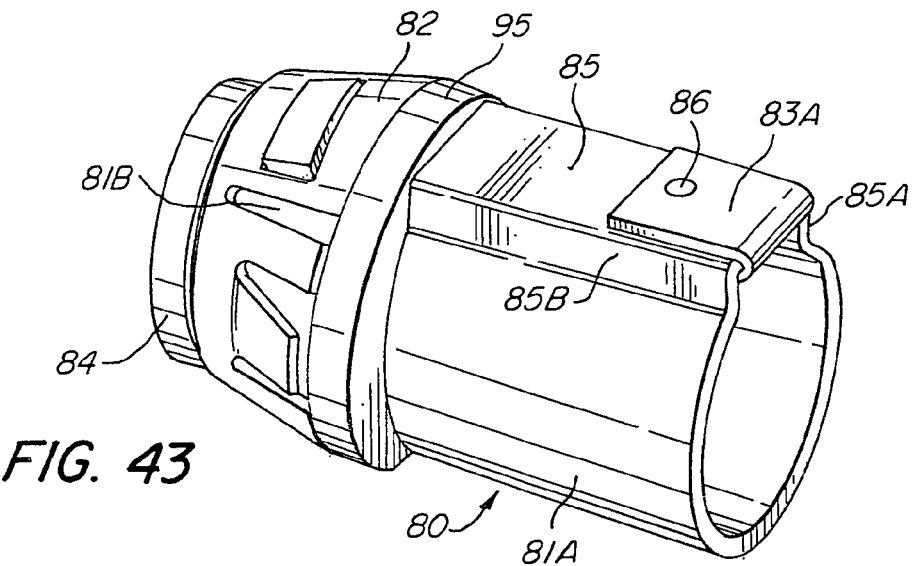
FIG. 43 is a perspective view of the assembled connector embodiment shown in FIG. 33.
Figure 44:
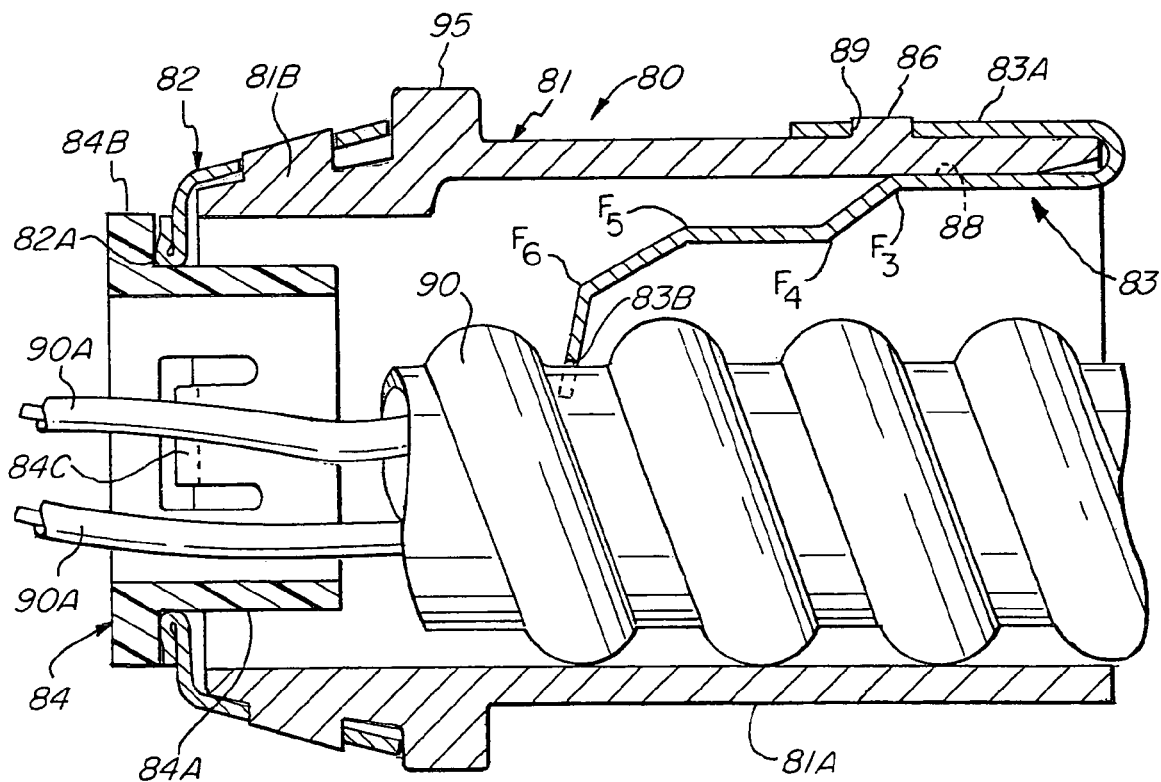
FIG. 44 is a side sectional view of the connector assembly of FIG. 43.
Figure 50:
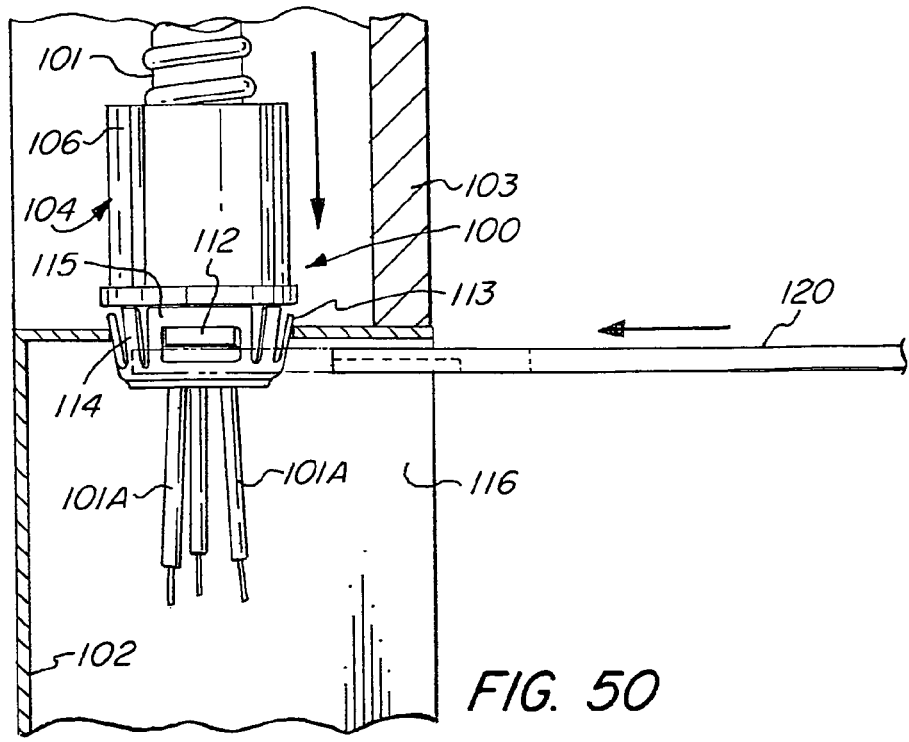
FIG. 50 is a side elevation view illustrating the initial insertion of the connector assembly of FIG. 45 into a knockout hole of an electric box.
Figure 51:
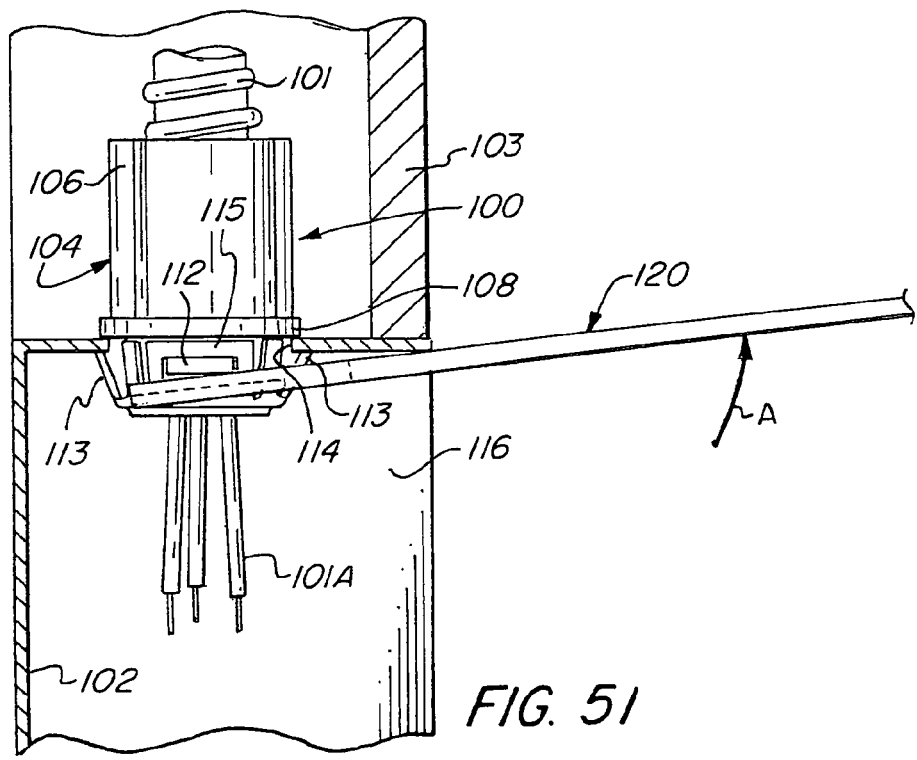
FIG. 51 is a side elevation view similar to FIG. 50 illustrating the connector assembly fully seated and locked in the knockout hole of an electric box which is affected by the lever action of the operating tool.
Figure 57:
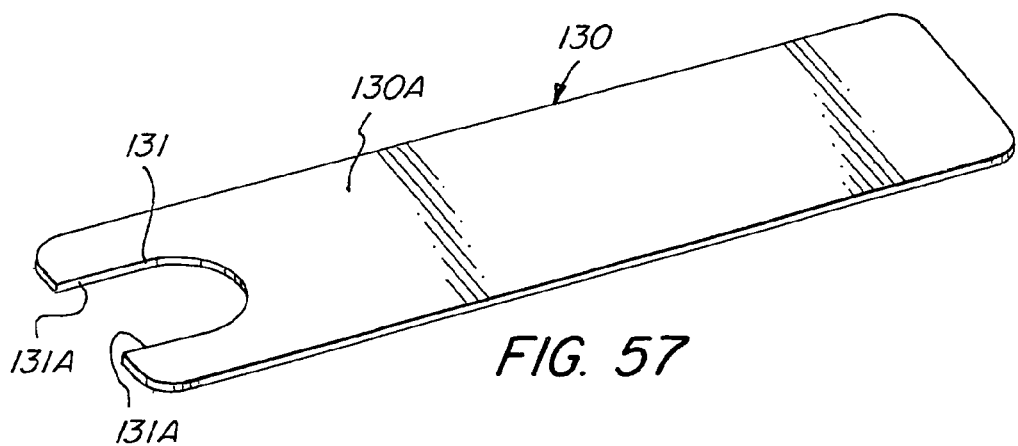
FIG. 57 is a perspective view of a slightly modified tool.
Figure 58:
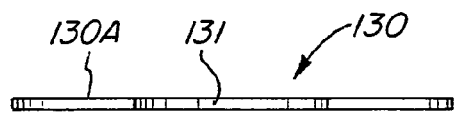
FIG. 58 is a left end view of FIG. 57.
Figure 59:
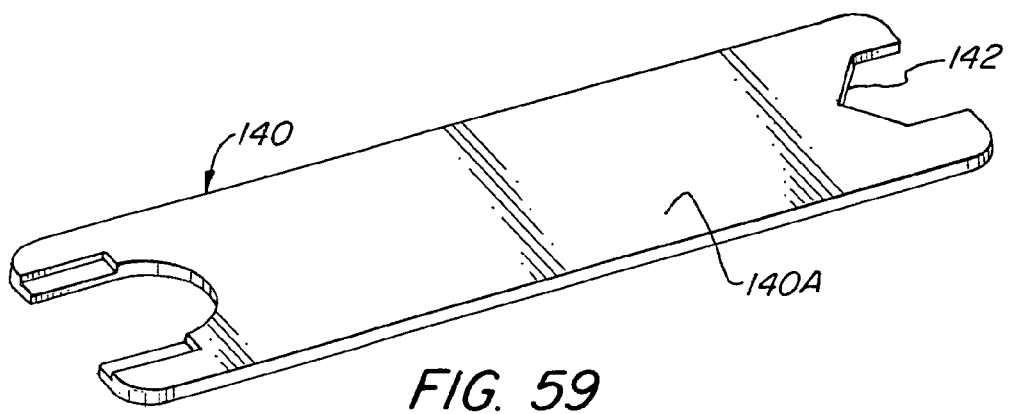
FIG. 59 is a perspective view of still another modified operating tool.
Figure 60:
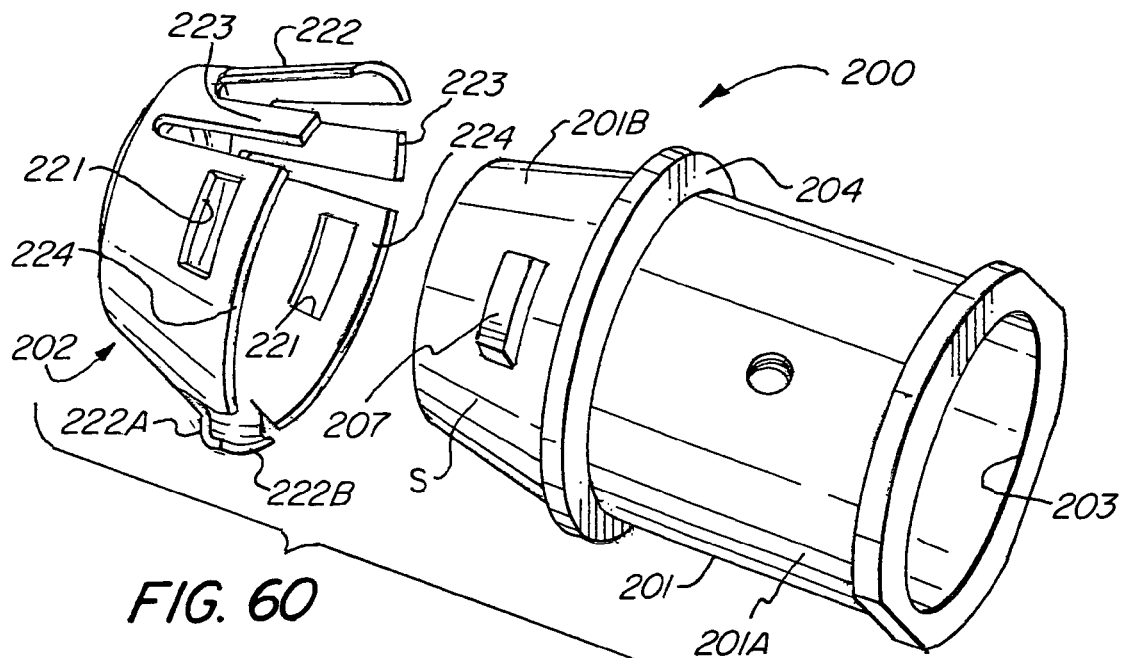
FIG. 60 is an exploded perspective view of another modified form of the invention.

As illustrated in FIG. 2, the opposed pair of arms AA are each provided with a retaining slot 21. The opposed pair of arms BB, as best seen in FIG. 8, are blanked or formed to define a locking tang 22 and to either side thereof the trailing edge defines an electrical grounding tang 23, 23. As shown, the locking tang 22 is slightly shorter than the adjacent grounding tangs 23, 23. The arrangement is such that the free end of the locking tangs 22 are sprung outwardly and formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends or trailing edges of the frustro-conical ring define the grounding tangs 23 that are biased in engagement with the internal periphery of the knockout hole 14. Also, the free edges or ends 24, 24 of arms A,A in the assembled position will also function as electrical grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are cantileverly and outwardly bent or displaced relative to the surface of the frustro-conical ring at a slightly greater outwardly angle or slope than the adjacent grounding edge or tangs 23 and the slope of arms A,A. With the retaining ring 18 so formed, it can be readily fitted onto the outlet end portion 11B whereby the inherent resiliency of the arms A,A will cause the retainer slots 21 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

It will be understood that, if desired, the opening 20A may be enlarged to the diameter of the foldline f, in which case the arms A,A and B,B may be gradually bent about the periphery of the enlarged opening, thereby eliminating the face portion 20.

Figure 7:
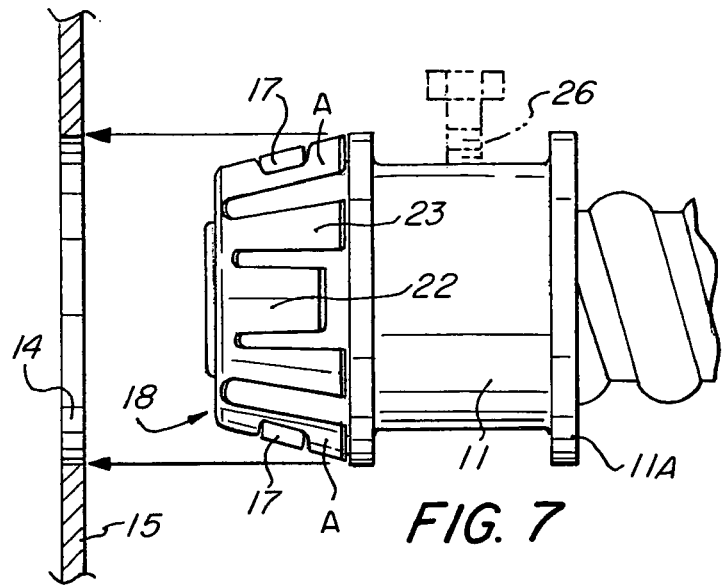
FIG. 7 is a side view of the connector assembly illustrating the alignment thereof relative to the knockout opening of an electric box.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the leading or outlet end portion into the knockout hole 14 until the flange 13 engages the outer side of the electric box 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free ends or edges 24 of arms A,A are normally biased in engagement with the internal periphery of the knockout hole 14 to ensure a positive electrical ground with the electric box 15. The engagement of the free ends 24 of arms A,A and grounding tangs 23, 23 against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means may be used, than the set screw 26 illustrated.

From the foregoing, it will be apparent that the disclosed connector assembly is quite novel and simple in construction. The snap fit retaining ring 18 can be simply formed from a cruciform shaped blank 19 whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

FIGS. 11 to 19 illustrate various views of a modified form of the invention which are described in application Ser. No. 11/100,250 filed Apr. 6, 2005 for Snap In Electrical Connector Assembly With Unidirectional Wire Conductor Ring, which is incorporated by reference herein.

FIGS. 20 to 32 are directed to a further modification of the disclosed invention. As best seen in FIGS. 20 and 21, the connector assembly 60 includes a housing or connector body 61 having an outlet end 61A and an inlet end 64 connected to the outlet end 61A by a transition section 68, 68A, preferably formed as casting of any suitable metal or alloy material, e.g. zinc, aluminum and the like. While the inlet end 64 of the connector body 61 is illustrated as a duplex inlet end, it will be understood that the inlet end may be formed to accommodate more than two separate wire conductors, cables or the like.

The outlet end 61A and the external frustro-conical ring 76 circumscribing the outlet end 61A are similar in structure hereinbefore described with respect to FIGS. 1 to 10. A more detailed description of the embodiments disclosed in FIGS. 20 to 32 as set forth in application Ser. No. 11/100,250 filed Apr. 6, 2005 for Snap In Electrical Connector Assembly With Unidirectional Wire Conductor Retaining Ring, which is incorporated herein by reference.

With the connector body of FIG. 20 illustrated, it will be noted that the connector assembly 60 can be readily secured to an electric box or panel simply by inserting the leading or outlet end 61A through a knockout hole of a panel or electrical box so as to be readily secured thereto with a snap fit as hereinbefore described. Also with the arrangement described, the respective wire conductors or cables 80 can be readily attached to the trailing or inlet end of the connector assembly 60 with a simple snap fit, as described in application Ser. No. 11/100,250 filed Apr. 6, 2005, which is incorporated by reference herein.

From the foregoing, it will be noted that the connector assemblies disclosed in FIGS. 1 to 32 utilize a frustro conically shaped outer retainer ring which is uniquely secured to the leading end of a connector body, with securing tangs and grounding tangs arranged to effect both a positive securement of the connector assembly to a knockout hole of an electric box or panel and a positive electrical ground. In association with an external frustro conical retaining ring, the disclosed embodiments include a trailing or inlet end constructed to receive an associated wire or conductor retainer in each inlet end for securing a wire conductor thereto by a snap fit inlet end of the connector body. It will be understood that the described electrical connector bodies may include one or more wire receiving chambers formed in the inlet end thereof, depending upon the number of wire conductors one may wish to connect to the inlet end of a connector body.

FIGS. 33 to 44 illustrate a further modification of the invention. In this embodiment, the connector assembly 81 includes a connector body 81A having an outer frustro conical external snap-fit retainer ring 82, a wire retainer device 83, and an optional plastic electrical insulating end ring insert 84. The outlet end 81B of the connector body 81A and the external frustro-conical retainer ring is similar in structure and function as hereinbefore described. A more detailed description of the embodiments 33 to 44 are set forth in application Ser. No. 11/151,374 filed Jun. 13, 2005, which is incorporated herein by reference.

FIGS. 45 to 51 illustrate further embodiments of the invention. The embodiments of FIGS. 45 to 51 are directed to a snap-fit electrical connector assembly 100 which is particularly suitable for attaching an electric cable or conductor 101 to an electric box 102 which is disposed in a finish wall structure 103, and which is rendered the subject matter of an application Ser. No. 11/258,990 filed Oct. 26, 2005.

It is frequently necessary to upgrade, repair, or add new electric conductors or circuits to existing electric boxes concealed within the wall of an existing structure. In such instances, the installer is generally unable to access a snap-fit connector so as to apply the necessary pulling or pushing force necessary to insert and lock a snap-fit connector assembly, e.g. 100, in a knockout opening of the electric box 102. Heretofore, in such situations, the installer generally utilized a connector having a threaded outlet end which could be readily passed through a knockout hole of an electric box, which could then be secured by threading thereon a lock nut from within the box opening, which is both difficult and time consuming.

The connector assembly 100, as illustrated, includes a connector body 104 having a leading end or outlet end 105 and a trailing or inlet end 106. The connector body may be formed as a metal casting of a suitable material, e.g. a zinc alloy, having a bore 107 extending therethrough. Circumscribing the connector body 104 between the outlet end 105 and the inlet end 106 is a radially outwardly extending stop flange 108. As hereinbefore described, the outer surface S of the outlet end 105 tapers or converges inwardly toward the central axis of the connector body 104 and the outlet opening 109.

Complementing the slope or taper of the outer surface S of the outlet end 105 is a frustro-conical snap-fit retainer ring 110 which is similar in structure hereinbefore described with respect to FIGS. 1 to 4, except that the width of the retaining slot 111 adapted to receive the retaining lug 112 is enlarged, as compared to the width of retaining slot 21 as hereinbefore described. As best seen in FIGS. 47 and 48, the retaining slot 111 has a width which is greater than the width of the retainer lug 112 adapted to be received in slot 111 in the assembled position, as best illustrated in FIGS. 46 and 47. In all other respects, the structure of the retainer ring 110 is similar to the construction of retainer ring 18 hereinbefore described with respect to the embodiments illustrated, for example in FIGS. 1 to 4, and which need not be repeated. A more detailed description of FIGS. 45 to 51 is set forth in application Ser. No. 11/258,990 filed Oct. 6, 2005, which is incorporated herein by reference.

Figure 61:
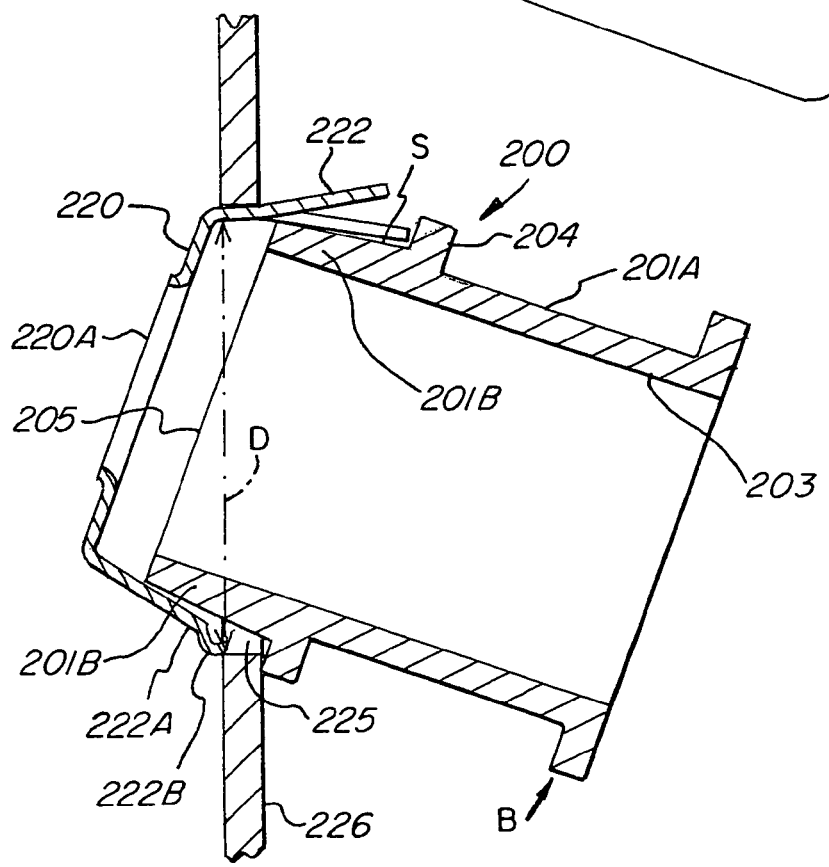
FIG. 61 is a section side view of the embodiment of FIG. 60 illustrating the manner for effecting the connection of the modified embodiment of FIG. 60 to a knock-out hole of an electric box.
Figure 62:
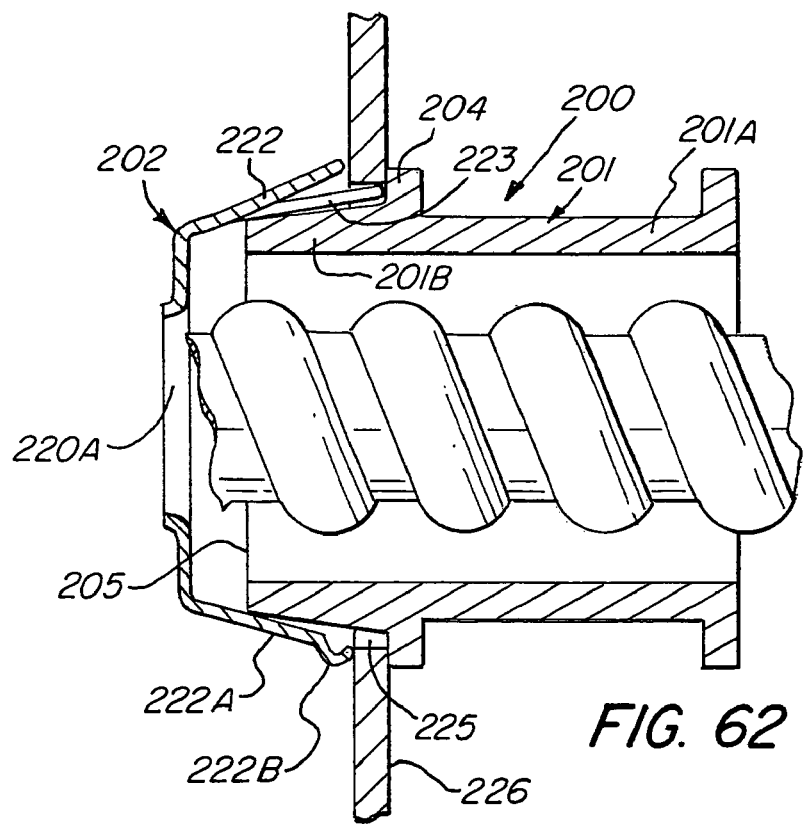
FIG. 62 is a section side view similar to FIG. 61 illustrating the connector assembly of FIG. 61 in locked position relative to an electric box.
Figure 63:
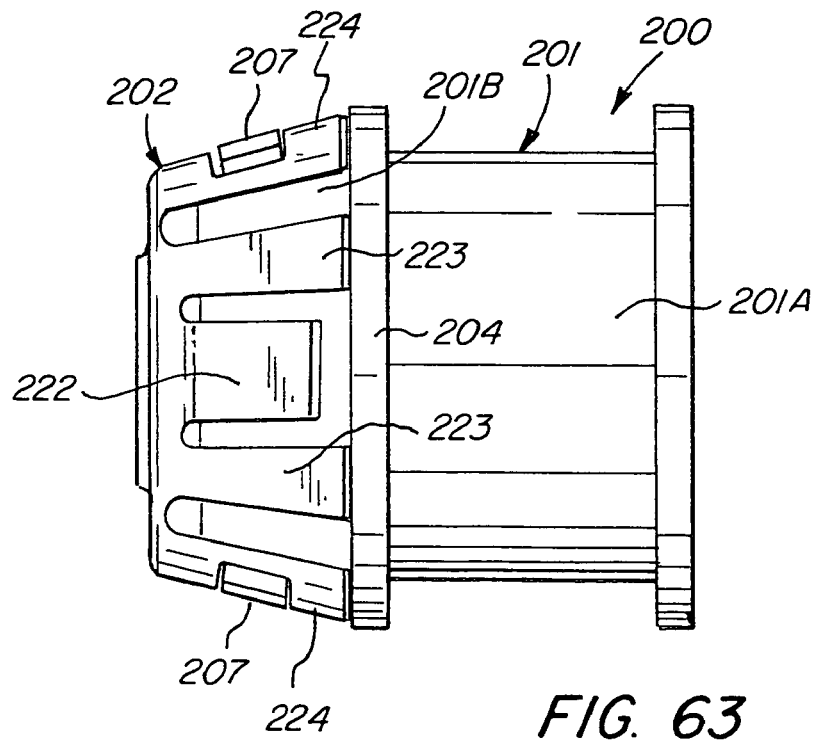
FIG. 63 is an assembled view of FIG. 1 connector
Figure 64:
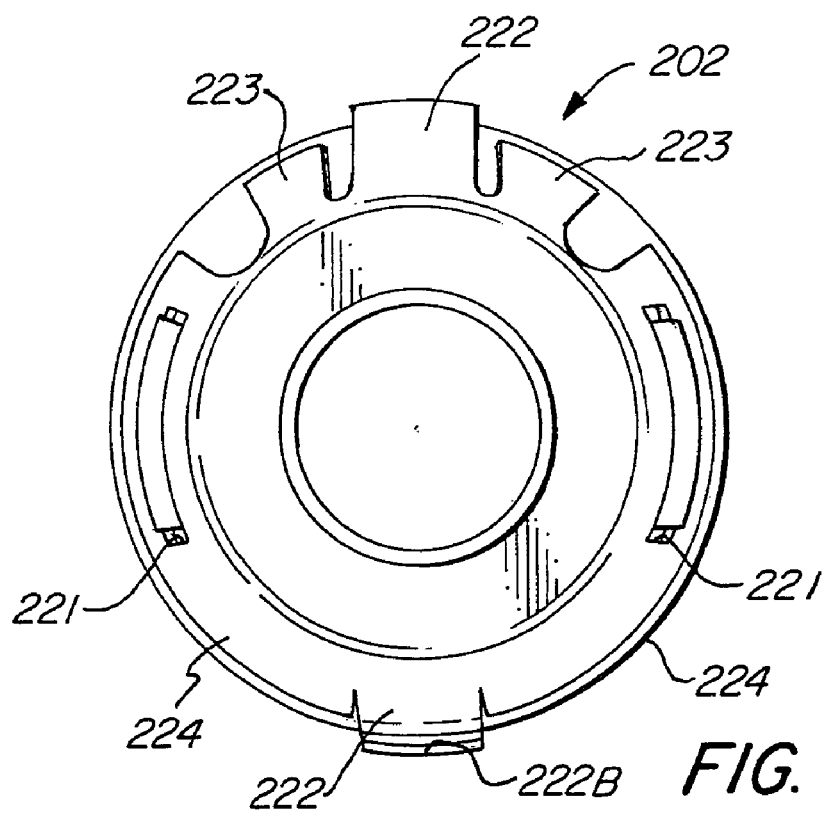
FIG. 64 is a front end view of the frustro-conical retainer ring of the embodiment illustrated in FIG. 60.
Figure 65:
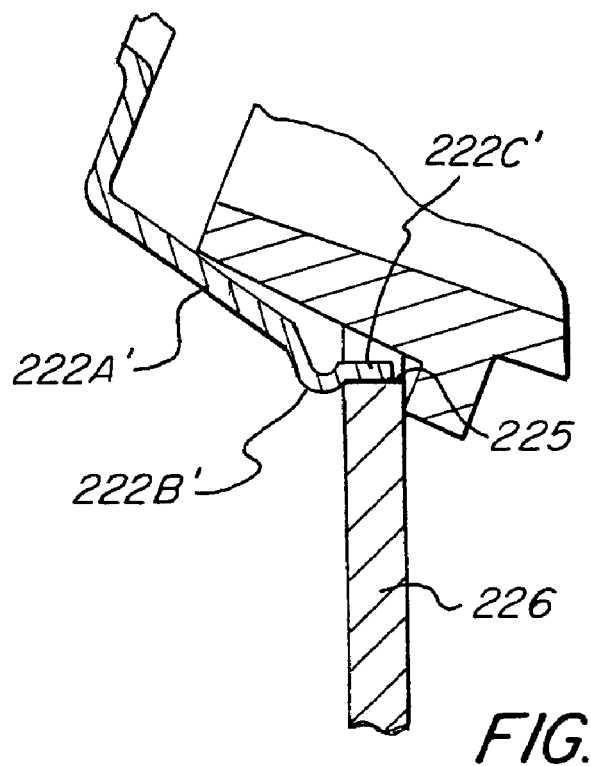
FIG. 65 is a fragmentary detail sectional side view of a modified auxiliary tang construction.
Figure 66:
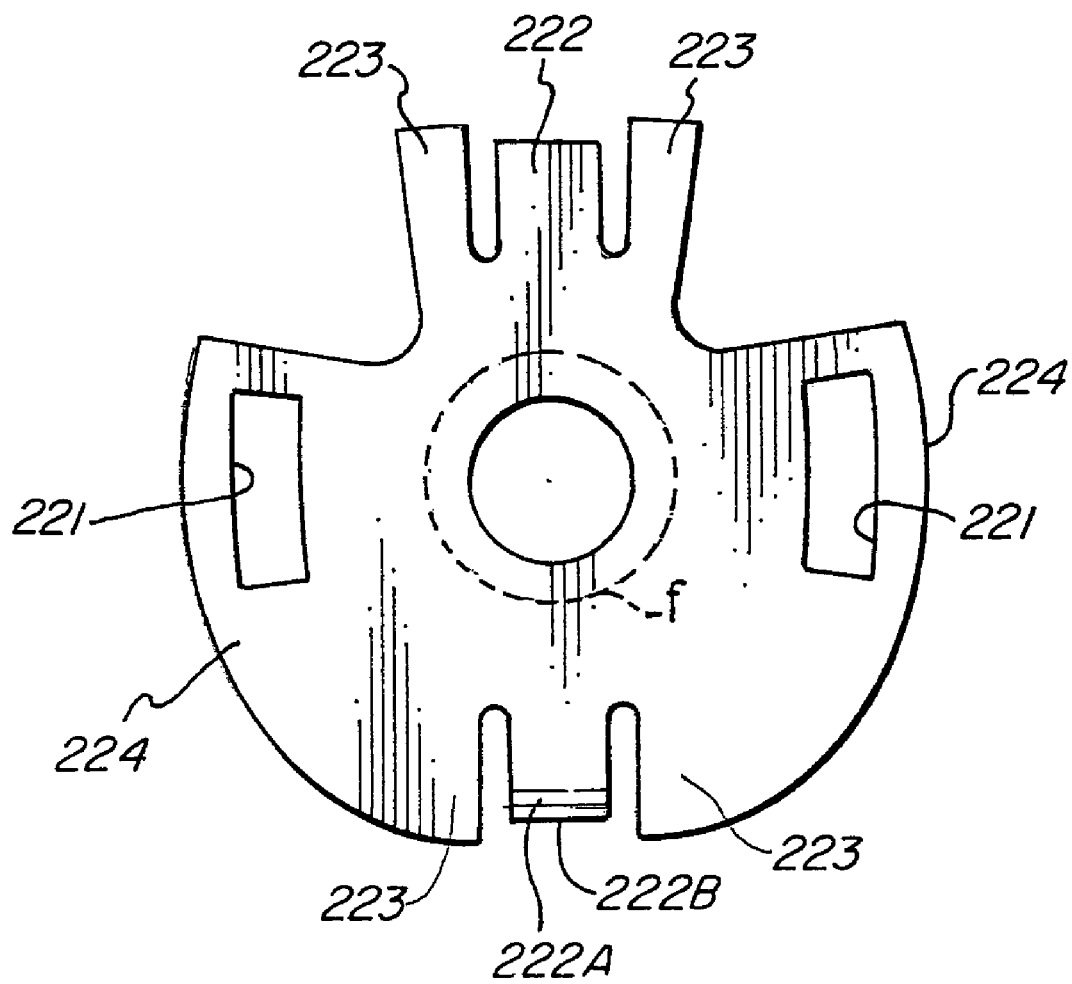
FIG. 66 is a plan view of a modified blank for forming a frustro-conical snap fit retaining ring.

FIGS. 60 to 64 illustrate a further embodiment of the invention. As best seen in FIGS. 61 and 62, the connector assembly 200 comprises a connector body 201 and a modified outer frustro-conical retainer ring 202 as described in a co-pending application Ser. No. 11/364,435 filed Feb. 28, 2006, for Snap Fit Electrical Connector Assembly For Facilitating The Electric Connector Assembly To An Electric Box, which is incorporated by reference herein.

While the embodiment of the connector assembly 200 of FIGS. 60-64 is illustrated without any electrical conductor retaining means associated with the inlet end portion 201A of the connector body 201, it will be understood that the inlet end portion 201A may be fitted with any of the wire conductor retainer means as are described and illustrated herein, the descriptions of which need not be repeated.

Figure 67:
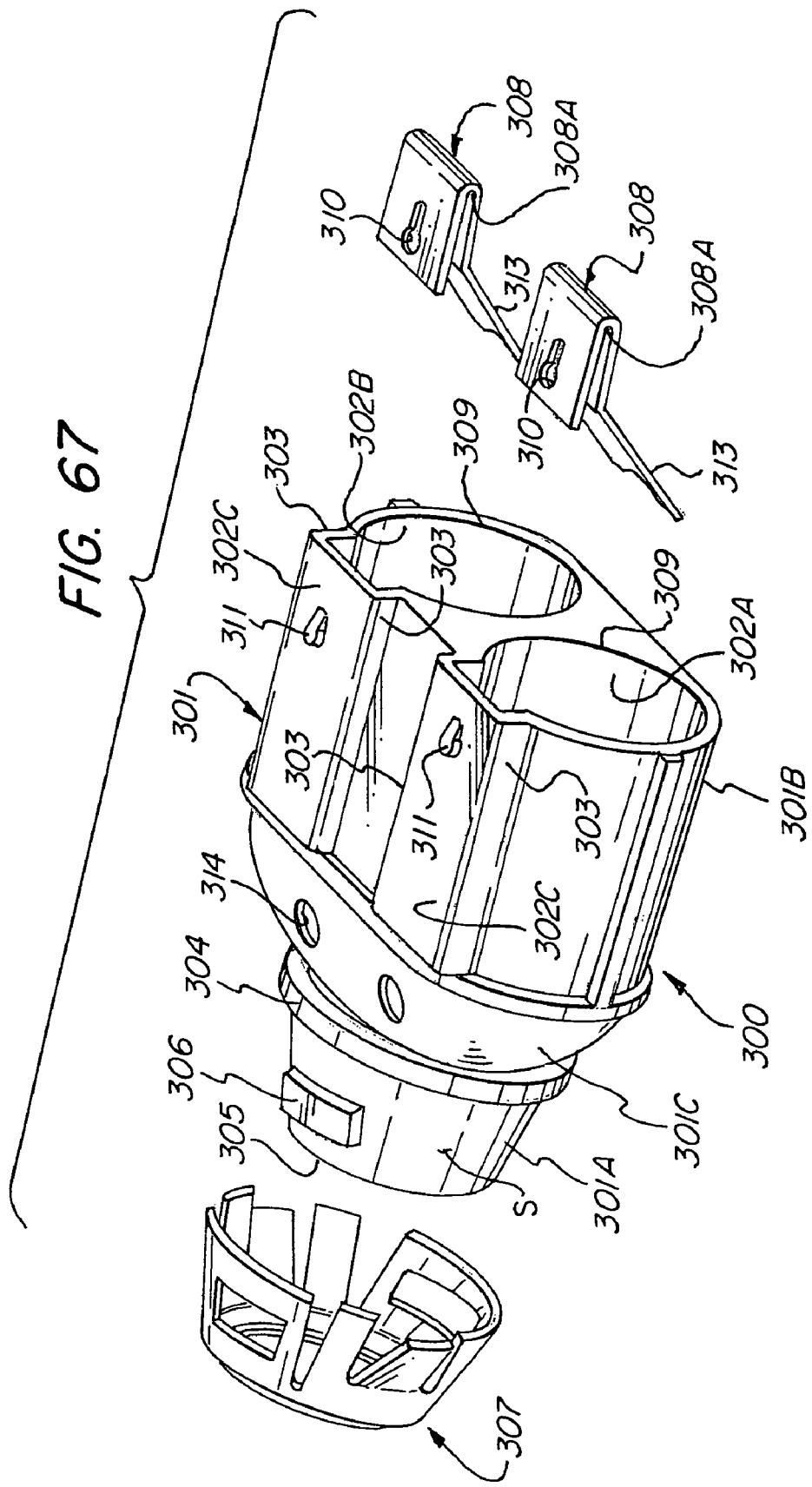
FIG. 67 is an exploded perspective view of still another modification of the invention.
Figure 68:
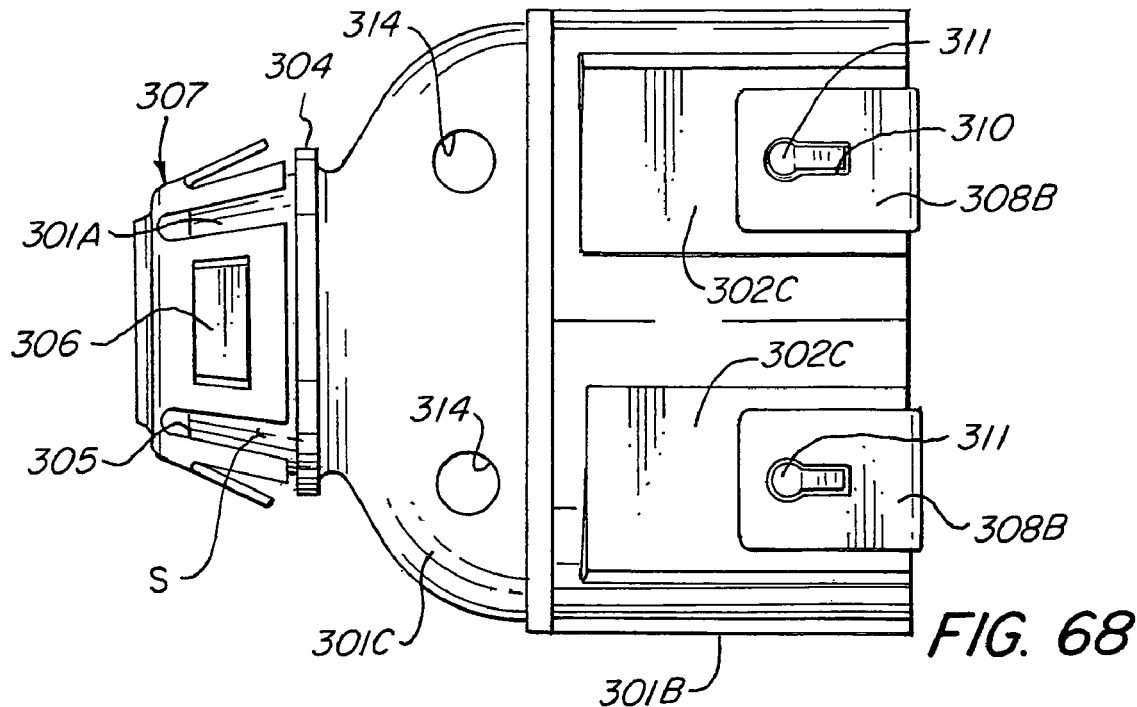
FIG. 68 is a top plan view of the embodiment of FIG. 67.
Figure 69:
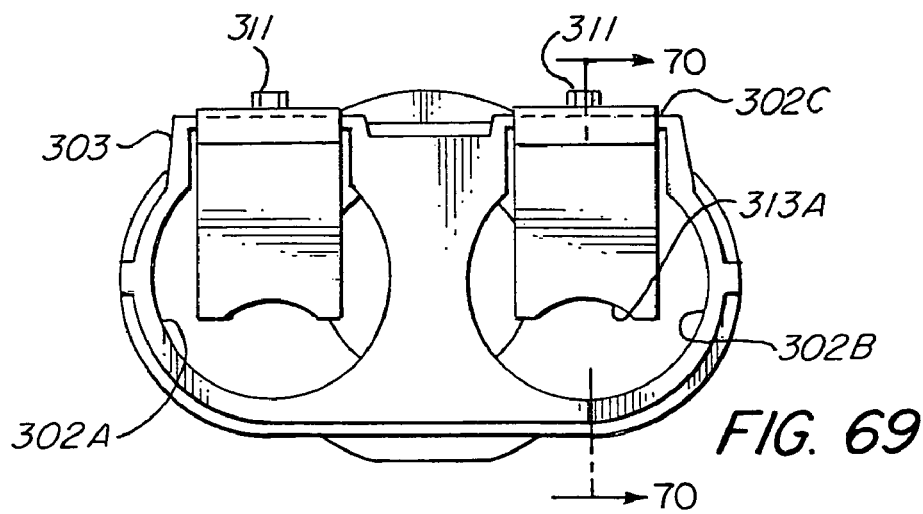
FIG. 69 is a right end view of FIG. 68.
Figure 70:
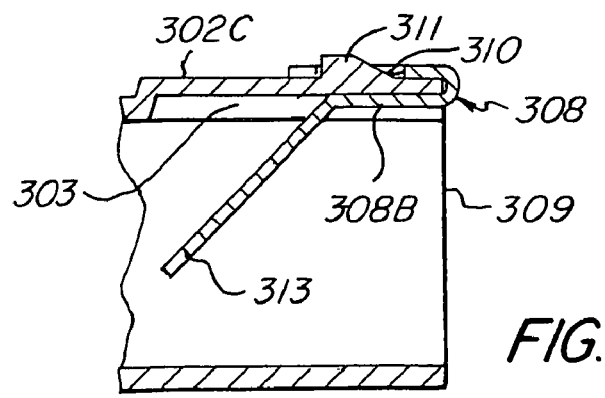
FIG. 70 is a sectional view taken along line 70-70 on FIG. 69.

FIGS. 67 to 70 illustrate a further embodiment of the invention. The connector assembly 300, as illustrated in FIGS. 67 and 68, includes a connector body 301 formed as a unitary casting of any suitable metal or alloy, e.g. zinc and the like. The form of the casting is somewhat similar to that shown in FIG. 20. The embodiment of FIG. 67 differs from that of FIG. 20 in that connector body 301 is formed as a unitary casting rather than as separable parts as illustrated in FIG. 20. A more detailed description of the embodiment of FIGS. 67 to 70 is set forth in application Ser. No. 11/403,099 filed Apr. 12, 2006, for Snap Fit Electrical Connector Assembly With Frustro-Conical Retainer Ring And Internal Unidirectional Snap Fit Wire Conductor Retainer, which is incorporated by reference herein.

From the foregoing, it will be apparent that the principle components described herein, viz. the external frustro-conical retainer rings, the connector bodies and the different wire conductor retainers, are rendered readily interchangeable with respect to the complementary components of the other embodiments described herein.

Figure 71:
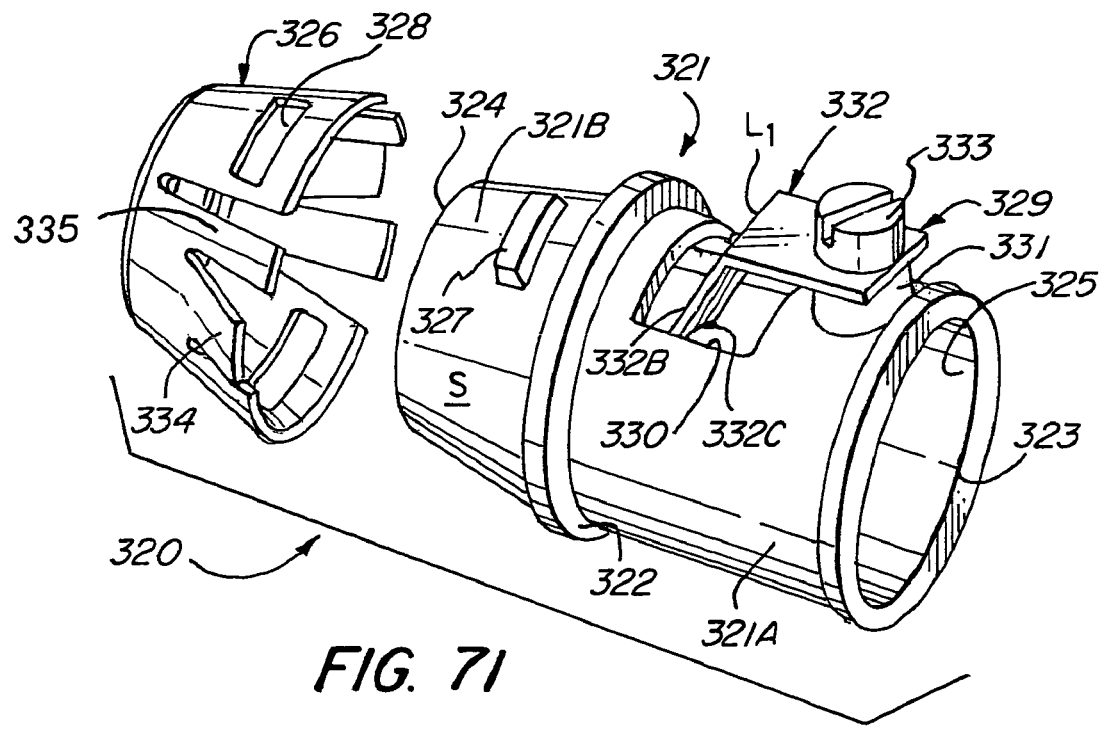
FIG. 71 is a perspective of a partially exploded view of another embodiment of the disclosed invention.

FIG. 71 illustrates a further embodiment of the invention. As shown, the electric connector assembly 320 includes a connector body 321 that has an inlet end portion 321A and a connected outlet end portion 321B. Intermediate between the inlet end portion 321A and the outlet end portion 321B there is provided a radially outwardly extending flange 322 which serves as a stop to limit the portion of the connector assembly 320 that may be inserted through a knock out hole of an electric box, as hereinbefore described.

The inlet end portion 321A defines an inlet opening 323 and the outlet end portion defines an outlet opening 324 that defines the opposed ends of a bore 325 that extends through the connector body between openings 323 and 324.

In this form of the invention, the outer surface S of the outlet end portion 321B slopes or tapers downwardly from the stop flange 322 toward the outlet opening 324, as hereinbefore described. Circumscribing the outer surface S of the outlet end portion 321B is a frustro-conical external snap fit ring 326 similar to that herein before described with locking tangs 334 and grounding tangs 335. The frustro-conical retainer ring 326 is retained on the sloping surface S of the outlet end portion by the retaining lugs 327 on the outlet end portion engaging the complimentary slots 328 formed in the frustro-conical surface of the outer retaining ring 326 as hereinbefore noted. The retaining lugs 327 and complementary slots 328 act as a means for retaining the frustro-conical retaining ring 326 on the outlet end portion 321B.

In this form of the invention, a simplified electrical conductor retainer 332 for securing an armor shielded electric wire, cable or other electrical conductor or wire for securing the same connector body is provided. As shown in FIG. 71, the inlet end portion 321A of the connector body 321 is provided with a window or opening 330 which is disposed in communication with the bore 325 extending through the connector body 321. Projecting outward from the inlet end portion adjacent the inlet opening 323 is a raised fastening mount or boss 331 having a generally flat upper surface 331A similar to that shown in FIG. 73.

Figure 73:
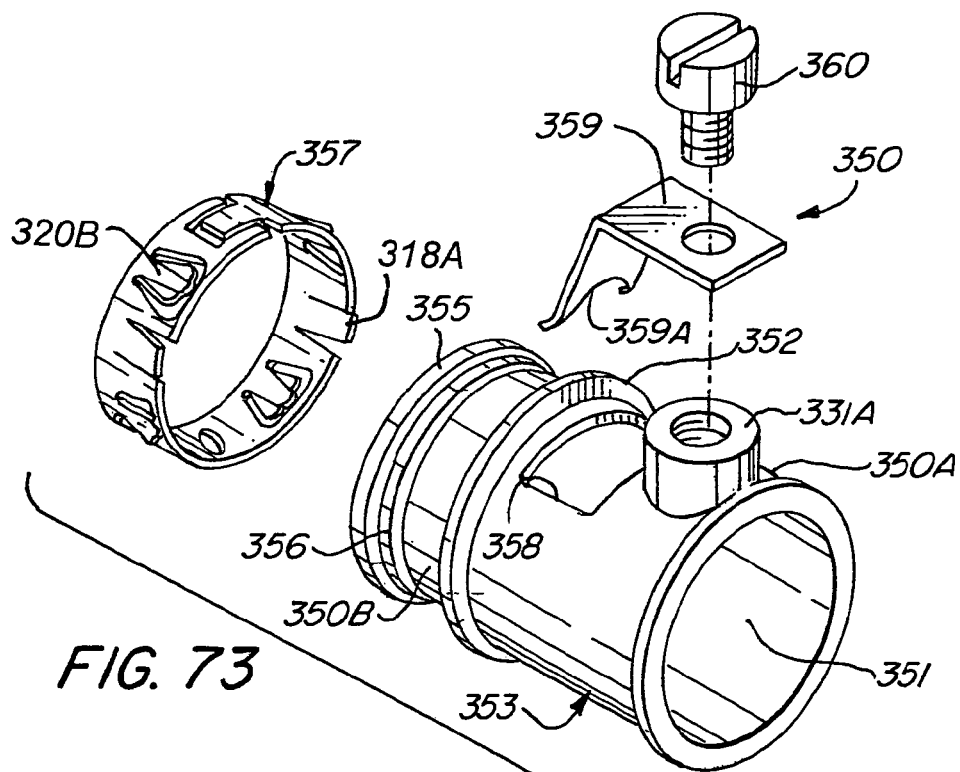
FIG. 73 is a perspective exploded view of a further embodiment of the invention.
Figure 74:
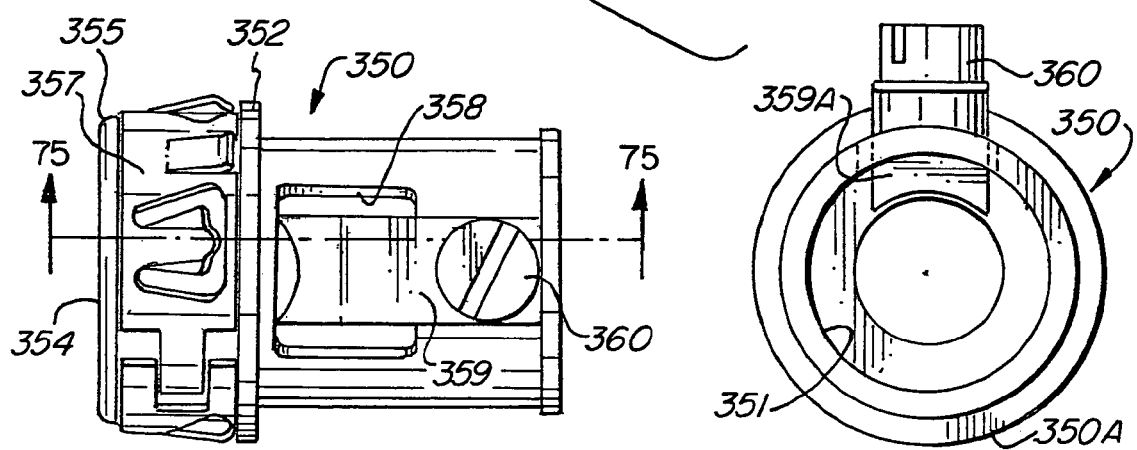
FIG. 74 is a side assembled view of FIG. 73.
Figure 76:
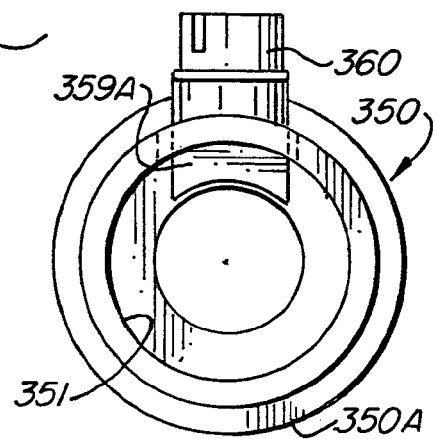
FIG. 76 is a right end view of FIG. 74.
Figure 75:
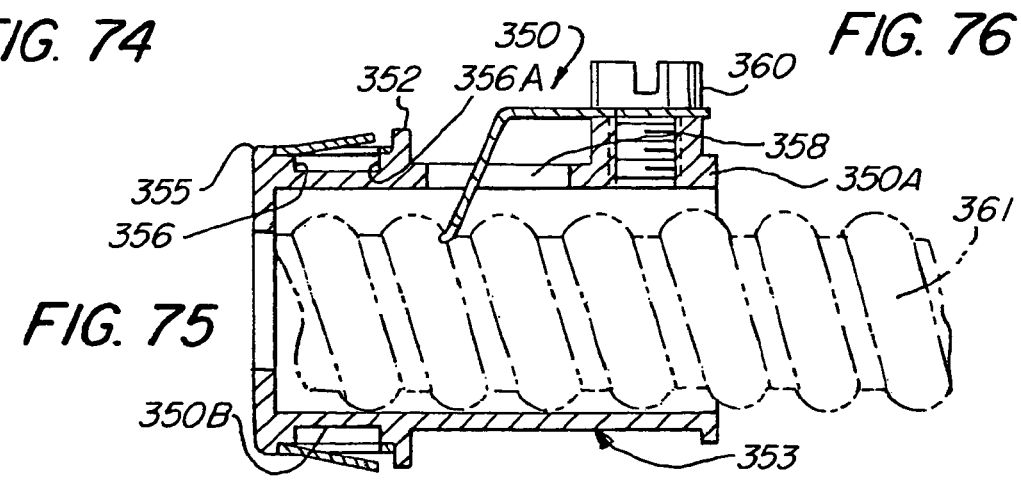
FIG. 75 is a side sectional view taken essentially along line 75-75 of FIG. 74.

Supported on mount or boss 331 is a conductor retainer 332. The conductor retainer 332 is formed of an elongated blank of spring metal, e.g. spring steel or other suitable resilient material, which is angularly bent along an intermediate fold or bend line $L_1$, wherein the angularly bent end 332B is projected through the window or opening 330 so as to extend into the bore 325 for engaging and retaining an electrical conductor as shown in the embodiment of FIG. 75. The other end 332A of the conductor retainer is detachably secured to the mount or boss 331 by means of a suitable fastener, e.g. a set screw. The free end 332C may be provided with an arcuate configuration as best seen in FIGS. 73 and 76 so as to conform with the shape of a wire conductor that is received within the inlet end portion of the connector body. As best noted in FIG. 75, the portion of the conductor retainer projecting through the window or opening 330 is bent at an angle so that the free end thereof is directed in the direction of the outlet opening 324 of the connector body 321. The arrangement is such that the wire conductor or armored shield conductor can be readily inserted into the inlet opening 323 in a unidirectional manner so that when the conductor is gripped by the free end 332C of the wire retainer 321, the wire conductor cannot readily be pulled out of the connector body without actively removing the inherent resisting force imparted by the conductor retainer onto the electric conductor.

From the foregoing description, it will be noted that the described electric connector assembly 320 can be readily secured to a knock out hole of an electric box simply by inserting the outlet end with the attached frustro-conical retainer ring through the knock out hole so that upon seating the assembly in the knock out hole causes the locking tangs 334 of ring 326 to spring outwardly and lock the connector assembly to the electric box. Also, the electric conductor can be simply attached to the connector simply by inserting the electric conductor into the inlet end portion wherein it is automatically gripped by the free end 332C in a manner to prohibit any unintentional separation of the electrical conductor from the associated connector assembly.

As will be noted, the wire retainer constitutes a simplified structure which can be readily formed simply from an elongated blank of spring steel or the like, which need only be bent intermediate the length thereof and which is externally mounted on the connector body. The simplified described conductor retainer enhances not only the ease of manufacture and assembly, the simplified structure further minimizes the amount and cost of material otherwise required by the known connectors capable of achieving the ease of use and utility of the invention disclosed in the embodiments described.

Figure 72:
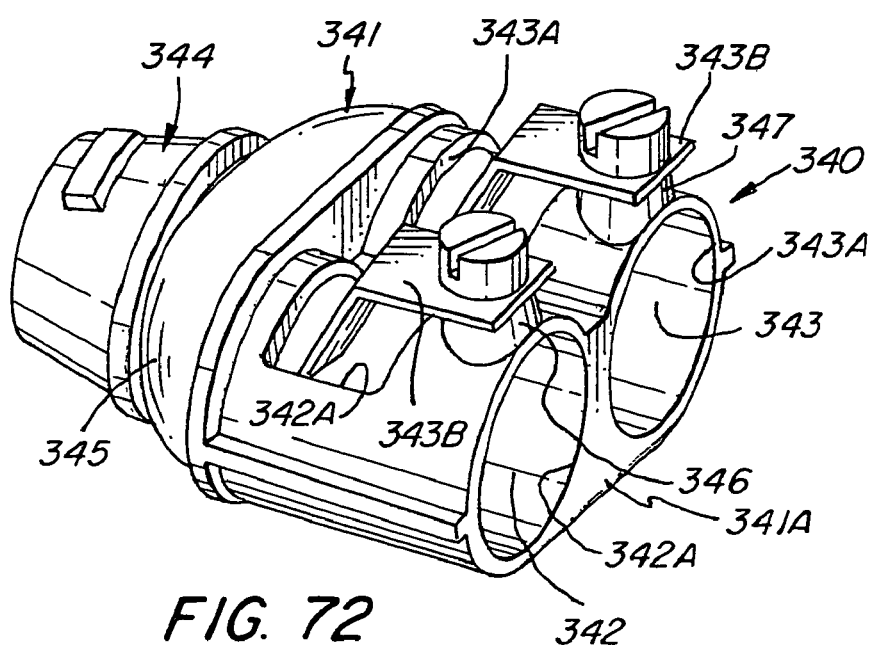
FIG. 72 is a perspective view of another modified form of the disclosed invention illustrated without the outer retainer ring.

FIG. 72 illustrates an embodiment of the invention as described with respect to the embodiment of FIG. 71, except that the invention is described as applied to a duplex type of an electrical connector assembly 340. As shown, the embodiment of FIG. 72 is directed to an electrical connector assembly having a connector body 341 that includes a trailing or inlet end portion 341A that is shaped so as to define at least two passageways 342, 343, having inlet openings 342A, 343A disposed in side by side relationship. While only two passages 342, 343 are illustrated, it will be understood that more than two passageways may be disposed in side by side relationship, depending upon the number of wire conductors one wishes to attach to a given connector body.

The connector body 341 also includes an outlet end portion 344 similar to outlet end portion 321B of FIG. 71, and need not be further described. It will be understood that the outlet end 344 is constructed so as to accommodate an outer retainer ring similar to the retainer ring 326 described with respect to FIG. 71, and as hereinbefore described. The embodiment of FIG. 72 includes a transition section 345 that connects the duplex inlet end portion 341A to the outlet end portion 344, and in communication therewith.

The connector body 341 of FIG. 72 also includes a retainer opening or window 342A, 343A disposed in communication with its corresponding passageway 342, 343. Connected to the connector body 341 are conductor retainers 343B, 343B which are similar in structure and function as hereinbefore described with respect to FIG. 71. As shown, the conductor retainers 343B, 343B are secured at one end externally of the connector inlet end portion 341A on a mount or boss 346, 347 in the same manner as hereinbefore described. In all other respects, the structure and function of the connector assembly 340 is similar to that described with respect to the embodiment of FIG. 71.

FIG. 73 illustrates another embodiment of the invention. As illustrated, the connector assembly includes a connector body 353 having an inlet end portion 350A and an outlet end portion 350B and a bore 351 extending therethrough. A stop flange 352 extends radially outwardly of the connector body 353 and defines the inlet end portion 350A from the outlet end portion 350B. Circumscribing the outlet opening 354 of the connector body 353 is a radially outwardly extending outlet flange 355. Adjacent to each of said stop flange 352 and outlet end flange 355 there is provided a shoulder 356 356A, wherein the shoulders 356, 356A have an outer diameter which is less than the outer diameter of the stop flange 352 and outlet end flange 355. Supported on the shoulders 356, 356A between the stop flange 352 is an outer retainer ring 357, having locking and grounding tangs 318A and 320B, which is similar in structure and function to that described in patent application Ser. No. 10/283,978 filed Oct. 30, 2002, now U.S. Pat. No. 6,860,758, which is incorporated herein by reference.

The connector assembly 350 is further provided with a window or opening 358 formed in the inlet end portion 350A similar to that hereinbefore described. Associated with the window or opening 358 is a conductor retainer 359 which is similar in structure and function as the conductor retainer hereinbefore described with respect to the embodiment of FIG. 71. The wire or conductor retainer 359 is secured to a mount or boss 331A by means of a suitable fastener or set screw 360 whereby the free end 359A of the conductor retainer 359 is directed through the window or opening 358 to engage the electrical conductor 361, as hereinbefore described.

Figure 77:
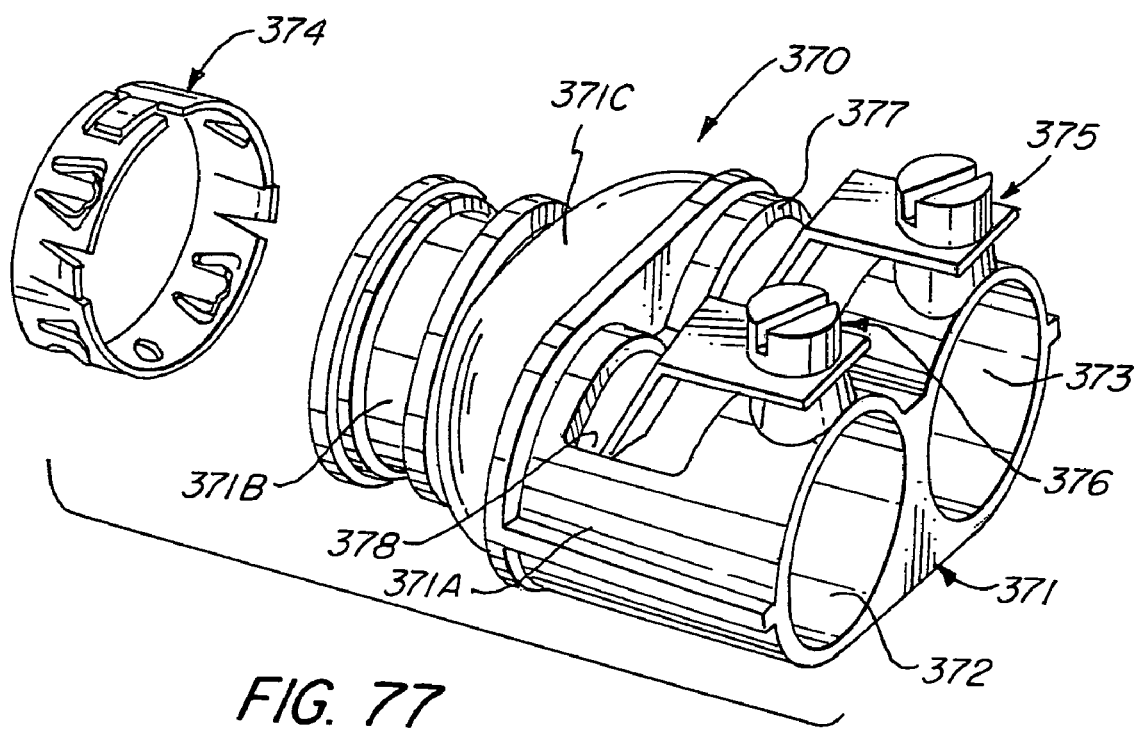
FIG. 77 is a perspective exploded view of a modified form of the invention.

FIG. 77 illustrates a duplex version of the embodiment disclosed in FIG. 76. The embodiment of FIG. 77 is directed to an electrical connector assembly 370 that includes a connector body 371 having a duplex inlet end portion 371A, an outlet end portion 371B, and an interconnected transition section 371C interposed between the inlet end portion 371A and outlet end portion 371B. In the illustrated embodiment, the inlet end portion is formed and illustrated as having a pair of side by side passageways 372 and 373 extending through the inlet portion 371A, each passageway 372 and 373 being adapted to receive an electric conductor of the type hereinbefore described. The respective passageways 372, 373 lead to the interior of the transition section 371C wherein the wires of the electric conductor are directed to and out of the inlet end portion 371B, as best noted in FIG. 20. It will be understood that while the embodiment of FIG. 77 has been illustrated and described as a duplex version of FIG. 77, the inlet end portion 371A may be construed to have more than two passageways 372, 373, with or without partition walls, disposed in side by side relationship, depending upon the number of individual wire conductors one desires to connect to a given inlet end portion of a connector body.

The outlet end portion 371B is similar to the outlet end portion 350B of FIG. 73, which is arranged to receive an outer retainer ring 374, which is structurally and functionally as that described with respect to the embodiment of FIG. 73, and need not be repeated.

The embodiment disclosed in FIG. 77 includes an electrical conductor retainer means 375, 376 and an associated window or opening 377, 378 for each passageway 373, 374. The respective electrical retainer means 375, 376 are identical in structure and function to that hereinbefore described with respect to the electrical conductor means described with respect to the embodiment of FIG. 73.

FIGS. 78 and 79 are directed to another modified form of the invention. In this embodiment, the connector assembly 380 includes a connector body 382 having an inlet end portion 380A and an outlet end portion 380B wherein the inlet end portion 380A has an outer diameter "D" which is greater than the outer diameter "d" of the outlet end portion 380B. By increasing the thickness of the inlet end portion 380A, the need for a stop flange, as hereinbefore described, is rendered unnecessary as the leading edge 381 of the inlet end portion 380A can function as the stop or limit the distance the connector body 382 may be inserted through a knock out hole of an electric box or panel.

The outlet end portion 380B is provided with a radially outwardly extending flange 383 that circumscribes the outlet end opening 384. Disposed between the leading edge 381 of the inlet end portion 380A and the outlet opening flange 383 are a pair of spaced apart shoulders 385, 386, which extend radially outwardly a distance that is less than that of the leading edge 381 and the outlet opening flange 383 which define therebetween a circumscribing groove or space "g".

To enable the connector body 382 of FIGS. 78, 79 to be connected to a knock out hole of an electric box with a snap fit, a circular snap fit retainer ring-like ring 374 as shown and described with respect to FIG. 77 is disposed on the shoulders 385, 386 and is retained thereon between the outlet opening flange 383 and the leading edge 381.

The connector assembly 380 of FIGS. 78 and 79 is also provided with a simplified electric conductor retainer means that includes an elongated blank of spring metal 387 which is formed as hereinbefore described in FIGS. 73 to 77 and which is affixed at one end to the external surface of the inlet end portion by a set screw or other suitable fastening means 388, as hereinbefore described.

To reduce the weight and lessen the amount of material used in casting the connector body 383, the inlet end portion 380A may be provided with a series of circumferential voids or spaces 390 formed within the thickness of the inlet end portion.

FIGS. 80 and 81 illustrate a further embodiment of the invention. This form of the invention is similar to that described with respect to the embodiment of FIGS. 78 and 79, except that the connector assembly 395 includes an inlet end portion 395A that is formed with a radially outward projecting protective wall 396 that circumscribes the window or opening 397 on three sides. As noted in FIGS. 80 and 81, the conductor retainer 398 is disposed within the perimeter of the protective wall 396. In all other respects, the construction and function of the connector assembly is similar to that described in FIGS. 78 and 70, and need not be repeated.

FIGS. 82 and 83 are directed to a further modification of the invention. In this form, the connector assembly 400 includes a connector body 401 having an inlet end portion 401A, an outlet end portion 401B and having a bore 402 extending therethrough. A radially outwardly extending flange 403 circumscribes the connector body intermediately thereof to define the inlet end portion 401A from the outlet end portion 4013. Circumscribing the outlet end portion 401B are external threads 404 which are adapted to receive a lock nut (not shown) for securing the connector assembly to a knock out hole of an electric box.

Formed on the exterior end of the inlet end portion 401A is a projecting boss or fastening mount 405, as hereinbefore described.

Mounted on the exterior fastening mount or boss 405 is a conductor retainer 406 similar in structure and function as hereinbefore described with respect to each of the embodiments disclosed herein.

The free end 406A is angularly bent relative to the mounted end 406B so as to extend through a window or opening 407, as hereinbefore described.

From the foregoing detailed description, it will be noted that each of the described connector assemblies, with the exception of the embodiment of FIGS. 82 and 83, are constructed so that the embodiments can be readily and quickly connected to a knock out hole of an electric box with a simple snap fit connection. All of the respective embodiments also have in common a simplified externally mounted wire or conductor retainer in the form of a flat spring which can be readily secured to the exterior portion of the connector body adjacent the inlet by means of a simple fastener, which flat spring is shaped to have its other free end extending through a window or opening so as to extend into the inlet end portion of the connector body in a manner whereby a wire conductor can be readily unidirectionally inserted into the inlet end portion and simultaneously secured therein in a manner that prohibits any unintentional separation or pull out of the wire conductor from the connector assembly, all without the need of any extraneous tools.

The embodiment of FIGS. 82 and 83 can be secured to a knock out hole by means of a conventional lock nut while attaining the benefits of the simplified wire retainer means as described herein.

While the present invention has been described with respect to several embodiments, it will be understood that various modifications may be made without departing from the spirit or scope of the invention.

What is claimed is:

1. An electric connector assembly comprising:
   a connector body having an inlet end portion and an outlet end portion, and having a bore extending therethrough;
   the outlet end portion defining an outlet opening, and the inlet end portion defining an inlet opening;
   a radially outwardly extending stop flange on said connector body between the inlet and outlet end portions;
   an outer retainer ring circumscribing the outlet end portion;
   means, intermediate the outlet end portion and said radially outwardly extending stop flange, for retaining said outer retainer ring on the outlet end portion;
   locking tangs circumferentially spaced about an outer surface of said outer retainer ring, said locking tangs being blanked and bent forming a cantilever out of the surface of said outer retainer ring whereby free ends of said locking tangs are directed toward said radially outwardly extending stop flange;
   a body opening formed in said connector body intermediate said radially outwardly extending stop flange and the inlet end portion; and
   a resilient elongated conductor retainer comprising one end externally connected to the inlet end portion adjacent the inlet opening and another end angularly bent extending through said body opening and into the bore of said connector body and being directed toward the outlet opening,
   whereby an electrical conductor may be unidirectional insertion into and held in the inlet end portion.

2. An electrical connector assembly as in claim 1 wherein:
   the outlet end portion comprises an outer surface that slopes downwardly toward the outlet opening; and
   said outer retainer ring comprises a leading end, a trailing end, and an intermediate sloping surface therebetween forming a frustro-conical configuration complementing the outer surface of the outlet end portion,
   wherein a diameter of the trailing end of the frustro-conical configuration is greater than a diameter of the leading end of said outer retainer ring.

3. An electrical connector assembly as in claim 1 wherein:
   said outer retainer ring comprises a split cylinder ring.

4. An electrical connector assembly as in claim 3 further comprising:
   an outer flange formed on the outlet end portion adjacent the outlet opening;
   a first shoulder adjacent said outer flange; and
   a second shoulder adjacent said radially outwardly extending stop flange,
   wherein the split cylinder ring is placed between said first and second shoulder on the outlet end portion.

5. An electrical connector assembly as in claim 1 further comprising: a plurality of grounding tangs extending radially outward from said outer retainer ring; and wherein each of said plurality of said grounding tangs has a length greater than each of said locking tangs, whereby said plurality of grounding tangs each contact an inside surface of a knockout hole in an electric box and each of said locking tangs contact an exterior surface of the electrical box.

6. An electric connector assembly for attachment to an electrical box having a knockout hole comprising: a connector body having an inlet end portion with an inlet opening and an outlet end portion with an outlet opening, and having a bore extending therethrough; an outer flange formed on the outlet end portion adjacent the outlet opening; a radially outwardly extending stop flange on said connector body between the inlet and outlet end portions: a first shoulder adjacent said outer flange; and a second shoulder adjacent said radially outwardly extending stop flange; a flange space separating said first and second shoulders; an outer retainer ring circumscribing the outlet end portion and held thereon; locking tangs circumferentially spaced about an outer surface of said outer retainer ring, said locking tangs being blanked and bent forming a cantilever out of the surface of said outer retainer ring whereby free ends of said locking tangs are directed toward said radially outwardly extending stop flange; grounding tangs circumferentially spaced about the outer surface of said outer retainer ring, said grounding tangs being blanked and bent forming a cantilever out of the surface of said outer retainer ring whereby free ends of said grounding tangs are directed toward said radially outwardly extending stop flange; a body opening formed in said connector body intermediate said radially outwardly extending stop flange and the inlet end portion; and a resilient elongated conductor retainer having one end externally connected to the inlet end portion adjacent the inlet opening and another end angularly bent to extend through said body opening and into the bore of said connector body and being directed toward the outlet opening, whereby the electrical connector may be placed in a knockout hole in the electrical box and held therein by said locking tangs and an electrical conductor may be unidirectional insertion into and held in the inlet end portion.

7. An electric connector assembly for attachment to an electrical box having a knockout hole comprising:
- a connector body comprising an inlet end portion, an outlet end portion, and a bore extending therethrough, the outlet end portion comprising an outlet opening, and the inlet end portion comprising an inlet opening;
- a radially outwardly extending stop flange on said connector body between the inlet and outlet end portions;
- an outer retainer ring circumscribing the outlet end portion and held thereon;
- locking tangs circumferentially spaced about the outer surface of said outer retainer ring, said locking tangs being blanked and bent forming a cantilever out of the surface of said outer retainer ring whereby free ends of said locking tangs are directed toward said radially outwardly extending stop flange;
- a body opening formed in said connector body intermediate said radially outwardly extending stop flange and the inlet end portion; and
- a resilient elongated conductor retainer comprising one end externally connected to the inlet end portion adjacent the inlet opening and another end angularly bent to extend through said body opening and into the bore of said connector body with a distal end extending toward the outlet opening,
- whereby the electrical connector when placed in a knockout hole in an electrical box is held therein by said locking tangs and the electrical conductor may be unidirectional insertion into and held in the inlet end portion.

8. An electric connector assembly for attachment to an electrical box having a knockout hole as in claim 7 further comprising:
- grounding tangs circumferentially spaced about the outer surface of said outer retainer ring.

9. An electric connector assembly for attachment to an electrical box having a knockout hole as in claim 8 further comprising:
- a fastener mount extending from said connector body;
- a fastener attaching said resilient elongated conductor retainer onto said connector body and extending into said fastener mount.

10. An electric connector assembly for attachment to an electrical box having a knockout hole as in claim 9 wherein:
- said fastener comprises a screw having a longitudinal axis perpendicular to a longitudinal axis of said connector body.

11. An electric connector assembly for attachment to an electrical box having a knockout hole as in claim 10 further comprising:
- a protective wall placed around said fastener mount.

12. An electric connector assembly for attachment to an electrical box having a knockout hole comprising:
- a connector body comprising an inlet end portion having an inlet opening, an outlet end portion having an outlet opening, and a bore extending through said connector body;
- a radially outwardly extending stop flange on said connector body between the inlet and outlet end portions;
- means, on said outlet end portion, for retaining said outlet end portion in the knockout hole of the electrical box;
- a body opening formed in said connector body between said radially outwardly extending stop flange and the inlet end portion; and
- a resilient elongated conductor retainer comprising one end externally connected to the inlet end portion adjacent the inlet opening and another end angularly bent to extend through said body opening and into the bore of said connector body and having a distal end extending toward the outlet opening,
- whereby an electrical conductor is unidirectional insertion into and held in the inlet end portion.

13. An electric connector assembly for attachment to an electrical box having a knockout hole as in claim 12 further comprising:
- a fastener mount on the outlet end portion of said connector body.

14. An electric connector assembly for attachment to an electrical box having a knockout hole as in claim 12 wherein:
- said means for retaining comprises a frustro-conical ring.

15. An electric connector assembly for attachment to an electrical box having a knockout hole as in claim 14 further comprising:
- a slot placed in the frustro-conical ring and a mating retaining lug formed on the outlet end portion,
- whereby the mating retaining lug fits within said slot when the frustro-conical ring is placed on the outlet end portion.

16. An electric connector assembly for attachment to an electrical box having a knockout hole comprising:
- a connector body comprising an inlet end portion having an inlet opening, an outlet end portion having an outlet opening, and a bore extending through said connector body;
- a radially outwardly extending stop flange on said connector body between the inlet and outlet end portions;
- an outer retainer ring circumscribing the outlet end portion and held thereon;
- locking tangs circumferentially spaced about the outer surface of said outer retainer ring, said locking tangs being blanked and bent forming a cantilever out of the surface of said outer retainer ring whereby free ends of said locking tangs are directed toward said radially outwardly extending stop flange;
- grounding tangs circumferentially spaced about the outer surface of said outer retainer ring, said grounding tangs being blanked and bent forming a cantilever out of the surface of said outer retainer ring whereby free ends of said grounding tangs are directed toward said radially outwardly extending stop flange;
- wherein said grounding tangs have a length greater than said locking tangs;
- a body opening formed in said connector body between said radially outwardly extending stop flange and the inlet end portion; and
- a resilient elongated conductor retainer comprising one end externally connected to the inlet end portion adjacent the inlet opening and another end angularly bent to extend through said body opening and into the bore of said connector body and having a distal end extending toward the outlet opening,
- whereby the electrical connector when placed in the knockout hole in the electrical box is held therein by said locking tangs and said grounding tangs contact an inside surface of the knockout hole in the electrical box and an electrical conductor may be unidirectional insertion into and held in the inlet end portion of the electrical connector.

\* \* \* \* \*